(12) United States Patent
Soulodre

(10) Patent No.: US 8,036,767 B2
(45) Date of Patent: Oct. 11, 2011

(54) SYSTEM FOR EXTRACTING AND CHANGING THE REVERBERANT CONTENT OF AN AUDIO INPUT SIGNAL

(75) Inventor: Gilbert Arthur Joseph Soulodre, Ottawa (CA)

(73) Assignee: Harman International Industries, Incorporated, Northridge, CA (US)

( * ) Notice: Subject to any disclaimer, the term of this patent is extended or adjusted under 35 U.S.C. 154(b) by 1385 days.

(21) Appl. No.: 11/533,707

(22) Filed: Sep. 20, 2006

(65) Prior Publication Data

US 2008/0069366 A1    Mar. 20, 2008

(51) Int. Cl.
*G06F 17/00* (2006.01)
*H03G 3/00* (2006.01)

(52) U.S. Cl. .......................................... 700/94; 381/63
(58) Field of Classification Search ................... 700/94; 381/63
See application file for complete search history.

(56) References Cited

U.S. PATENT DOCUMENTS

| | | | |
|---|---|---|---|
| 4,066,842 A | 1/1978 | Allen | 179/1 P |
| 4,118,599 A | 10/1978 | Iwahara et al. | 179/1 G |
| 4,159,397 A | 6/1979 | Iwahara et al. | 179/1 GQ |
| 4,829,574 A | 5/1989 | Dewhurst et al. | 381/41 |
| 4,912,767 A | 3/1990 | Chang | 381/47 |
| 5,068,897 A | 11/1991 | Yamato et al. | 381/24 |
| 5,210,366 A | 5/1993 | Sykes | 84/616 |
| 5,210,802 A | 5/1993 | Aylward | 381/61 |
| 5,285,503 A | 2/1994 | Satoh et al. | 381/109 |
| 5,303,307 A | 4/1994 | Elko et al. | 381/92 |
| 5,305,386 A | 4/1994 | Yamato | 381/1 |
| 5,386,478 A | 1/1995 | Plunkett | 381/103 |

(Continued)

FOREIGN PATENT DOCUMENTS

EP    0 989 543 A2    3/2000

(Continued)

OTHER PUBLICATIONS

Theile, Gunther, "Wave Field Synthesis—A Promising Spatial Audio Rendering Concept", Proc. of the 7th Int. Conference on Digital Audio Effects, Oct. 5-8, 2004, pp. 125-132.*

(Continued)

*Primary Examiner* — Davetta Goins
*Assistant Examiner* — Daniel Sellers
(74) *Attorney, Agent, or Firm* — Brinks Hofer Gilson & Lione

(57) ABSTRACT

A method and apparatus for extracting and changing the reverberant content of an input signal is provided. The method of estimating an impulse response for a reverberant system includes sampling a signal from a reverberant system, having an impulse response, into a sequence of blocks, for each block of the sequence, determining a magnitude in dependence upon a magnitude of a previous block, forming an estimate of the impulse response using determined magnitudes as parameters for a finite impulse response filter. The method of creating a multi-channel signal using a signal with fewer channels from a reverberant system includes sampling the signal from a reverberant system, having an impulse response, into a sequence of blocks, for each block of the sequence, determining a magnitude in dependence upon a magnitude of a previous block, forming an estimate of the impulse response using determined magnitudes as parameters for a finite impulse response filter, applying an inverse of the estimated impulse response to the signal to derive at least one of a direct signal component and a reverberant signal component, and recombining the direct signal component and the reverberant signal component to create a multi-channel signal.

41 Claims, 8 Drawing Sheets

U.S. PATENT DOCUMENTS

| | | | |
|---|---|---|---|
| 5,394,472 A | 2/1995 | Broadie | 381/1 |
| 5,440,639 A | 8/1995 | Suzuki et al. | 381/17 |
| 5,491,754 A * | 2/1996 | Jot et al. | 381/63 |
| 5,511,129 A * | 4/1996 | Craven et al. | 381/103 |
| 5,568,558 A | 10/1996 | Ramm et al. | 381/94 |
| 5,579,396 A | 11/1996 | Iida et al. | 381/18 |
| 5,581,618 A | 12/1996 | Satoshi et al. | 381/17 |
| 5,710,818 A | 1/1998 | Yamato et al. | 381/1 |
| 5,742,689 A | 4/1998 | Tucker et al. | 381/17 |
| 5,754,663 A | 5/1998 | Goldfarb | 381/82 |
| 5,761,315 A | 6/1998 | Iida et al. | 381/18 |
| 5,822,438 A | 10/1998 | Sekine et al. | 381/17 |
| 5,848,163 A | 12/1998 | Gopalakrishnan et al. | 381/56 |
| 6,052,470 A | 4/2000 | Mouri | 381/18 |
| 6,111,962 A | 8/2000 | Akio | 381/63 |
| 6,122,382 A | 9/2000 | Iida et al. | 381/18 |
| 6,243,322 B1 | 6/2001 | Zakarauskas | 367/127 |
| 6,366,679 B1 | 4/2002 | Steffen et al. | 381/356 |
| 6,385,320 B1 | 5/2002 | Lee | 381/17 |
| 6,522,756 B1 | 2/2003 | Maisano et al. | 381/92 |
| 6,549,630 B1 | 4/2003 | Bobisuthi | 381/94.7 |
| 6,584,203 B2 | 6/2003 | Elko et al. | 381/92 |
| 6,625,587 B1 | 9/2003 | Erten et al. | 706/22 |
| 6,674,865 B1 | 1/2004 | Venkatesh et al. | 381/107 |
| 6,691,073 B1 | 2/2004 | Erten et al. | 702/190 |
| 6,754,623 B2 | 6/2004 | Deligne et al. | 704/233 |
| 6,850,621 B2 | 2/2005 | Sotome et al. | 381/17 |
| 6,937,737 B2 | 8/2005 | Polk, Jr. | 381/300 |
| 6,947,570 B2 | 9/2005 | Maisono | 381/313 |
| 6,956,954 B1 | 10/2005 | Takemura et al. | 381/307 |
| 7,003,119 B1 | 2/2006 | Arthur | 381/17 |
| 7,020,291 B2 | 3/2006 | Buck et al. | 381/92 |
| 7,039,197 B1 | 5/2006 | Venkatesh et al. | 381/86 |
| 7,065,416 B2 | 6/2006 | Weare et al. | 700/94 |
| 7,076,068 B2 | 7/2006 | Sotome et al. | 381/17 |
| 7,082,201 B2 | 7/2006 | Sotome et al. | 381/17 |
| 7,095,455 B2 | 8/2006 | Jordan et al. | 348/734 |
| 7,095,865 B2 | 8/2006 | Katayama et al. | 381/309 |
| 7,099,480 B2 | 8/2006 | Willems | 381/18 |
| 7,113,609 B1 | 9/2006 | Neidich et al. | 381/305 |
| 7,113,610 B1 | 9/2006 | Chrysanthakopoulos | 381/309 |
| 7,123,731 B2 | 10/2006 | Cohen et al. | 381/303 |
| 7,167,566 B1 | 1/2007 | Bauck | 381/17 |
| 7,171,003 B1 | 1/2007 | Venkatesh et al. | 381/66 |
| 7,177,432 B2 | 2/2007 | Eid et al. | 381/22 |
| 7,206,413 B2 | 4/2007 | Eid et al. | 381/22 |
| 7,231,053 B2 | 6/2007 | Polk, Jr. | 381/300 |
| 7,242,782 B1 | 7/2007 | Kasai et al. | 381/97 |
| 7,266,501 B2 | 9/2007 | Saunders et al. | 704/500 |
| 7,330,557 B2 | 2/2008 | Fischer et al. | 381/313 |
| 7,881,480 B2 | 2/2011 | Buck et al. | 381/94.1 |
| 2001/0036286 A1 | 11/2001 | Layton et al. | 381/304 |
| 2002/0037083 A1 | 3/2002 | Weare et al. | 381/58 |
| 2002/0037084 A1 | 3/2002 | Kakuhari et al. | 381/63 |
| 2002/0039425 A1 | 4/2002 | Burnett et al. | 381/94.7 |
| 2002/0159607 A1 | 10/2002 | Ford et al. | 381/103 |
| 2003/0007648 A1 | 1/2003 | Currell | 381/61 |
| 2003/0045953 A1 | 3/2003 | Weare | 700/94 |
| 2003/0061032 A1 | 3/2003 | Gonopolskiy | 704/200.1 |
| 2003/0072460 A1 | 4/2003 | Gonopolskiy et al. | 381/92 |
| 2003/0128848 A1 | 7/2003 | Burnett | 381/71.8 |
| 2003/0135377 A1 | 7/2003 | Kurianski et al. | 704/500 |
| 2003/0169887 A1 | 9/2003 | Fujita et al. | 381/63 |
| 2003/0174845 A1 | 9/2003 | Hagiwara | 381/17 |
| 2003/0223603 A1 | 12/2003 | Beckman | 381/310 |
| 2004/0066940 A1 | 4/2004 | Amir | 381/94.2 |
| 2004/0223620 A1 | 11/2004 | Horbach et al. | 381/59 |
| 2004/0228498 A1 | 11/2004 | Sekine | 381/303 |
| 2004/0240697 A1 | 12/2004 | Keele, Jr. | 381/336 |
| 2004/0258255 A1 | 12/2004 | Zhang et al. | 381/92 |
| 2005/0053249 A1 | 3/2005 | Wu et al. | 381/310 |
| 2005/0069143 A1 | 3/2005 | Budnikov et al. | 381/63 |
| 2005/0129249 A1 | 6/2005 | Chabanne | 381/17 |
| 2005/0195984 A1* | 9/2005 | Miura et al. | 381/63 |
| 2005/0220312 A1 | 10/2005 | Kasai et al. | 381/97 |
| 2005/0232440 A1 | 10/2005 | Roovers | 381/92 |
| 2005/0249356 A1 | 11/2005 | Holmi et al. | 381/86 |
| 2005/0281408 A1 | 12/2005 | Kim et al. | 381/17 |
| 2005/0286727 A1 | 12/2005 | Otsuka | 381/18 |
| 2006/0039567 A1 | 2/2006 | Huang | 381/22 |
| 2006/0045275 A1 | 3/2006 | Daniel | 381/17 |
| 2006/0045294 A1 | 3/2006 | Smyth | 381/309 |
| 2006/0062410 A1 | 3/2006 | Kim et al. | 381/310 |
| 2006/0088175 A1 | 4/2006 | Eid et al. | 381/104 |
| 2006/0098830 A1 | 5/2006 | Roeder et al. | 381/310 |
| 2006/0109992 A1 | 5/2006 | Roeder et al. | 381/310 |
| 2006/0126878 A1 | 6/2006 | Takumai et al. | 381/335 |
| 2006/0171547 A1 | 8/2006 | Lokki et al. | 381/92 |
| 2006/0222182 A1 | 10/2006 | Nakaishi et al. | 381/27 |
| 2006/0222184 A1 | 10/2006 | Buck et al. | 381/71.1 |
| 2006/0233382 A1 | 10/2006 | Watanabe | 381/56 |
| 2006/0256978 A1 | 11/2006 | Balan et al. | 381/94.7 |
| 2006/0269071 A1 | 11/2006 | Nakano | 381/17 |
| 2006/0274902 A1 | 12/2006 | Hume et al. | 381/17 |
| 2006/0280311 A1 | 12/2006 | Beckinger et al. | 381/17 |
| 2006/0280323 A1 | 12/2006 | Neidich et al. | 381/300 |
| 2007/0014417 A1 | 1/2007 | Fujita et al. | 381/17 |
| 2007/0019816 A1 | 1/2007 | Konagai | 381/59 |
| 2007/0036366 A1 | 2/2007 | Konagai et al. | 381/61 |
| 2007/0047743 A1 | 3/2007 | Taenzer et al. | 381/92 |
| 2007/0064954 A1 | 3/2007 | Booth et al. | 381/58 |
| 2007/0110250 A1 | 5/2007 | Bauck | 381/20 |
| 2007/0110268 A1 | 5/2007 | Konagai et al. | 381/335 |
| 2007/0129952 A1 | 6/2007 | Kenyon et al. | 704/500 |
| 2007/0154020 A1 | 7/2007 | Katayama | 381/17 |
| 2007/0230725 A1 | 10/2007 | Wang | 381/309 |
| 2007/0253574 A1 | 11/2007 | Soulodre | 381/94.2 |
| 2008/0232603 A1 | 9/2008 | Soulodre | 381/63 |
| 2008/0232617 A1 | 9/2008 | Goodwin et al. | 381/307 |
| 2008/0260175 A1 | 10/2008 | Elko | 381/73.1 |
| 2011/0081024 A1 | 4/2011 | Soulodre | 381/17 |

FOREIGN PATENT DOCUMENTS

| | | |
|---|---|---|
| JP | 05-073082 | 3/1993 |
| JP | 2003-005770 | 1/2003 |
| JP | 2003-263178 | 9/2003 |
| JP | 2003-271165 | 9/2003 |
| WO | WO 01/76319 A2 | 10/2001 |
| WO | WO 2006/068009 A1 | 1/2006 |

OTHER PUBLICATIONS

Wang, David L., Lim, Jae S., The Unimportance of Phase in Speech Enhancement, IEEE Transactions on Acoustics, Speech, and Signal Processing, vol. ASSP-30, No. 4, Aug. 1982, 3 pgs.

Griesinger, David, "Practical Processors and Programs for Digital Reverberation," *Proceedings of the AES 7th International Conference, Audio Engineering Society*, Toronto, May 1989, pp. 187-195, (11 pgs.).

Griesinger, David, "Spaciousness and Envelopment in Musical Acoustics," *Presented at the 101st Convention of the Audio Engineering Society*, Los Angeles, Nov. 8-11, 1996, Preprint #4401, 13 pages.

Griesinger, David, "General Overivew of Spatial Impression, Envelopment, Localization, and Externalization," *Proceedings of the 15th International Conference of the Audio Engineering Society on Small Room Acoustics*, Denmark, Oct. 31-Nov. 2, 1998, pp. 136-149, (15 pgs.).

Griesinger, David, "Improving Room Acoustics Through Time Variant Synthetic Reverberation," *Presented at the 90th Convention of the Audio Engineering Society*, Paris, Feb. 1991, reprint #3014, 15 pgs.

Griesinger, David, "Room Impression Reverberance and Warmth in Rooms and Halls," *Presented at the 93rd Convention of the Audio Engineering Society*, San Francisco, Nov. 1992, Preprint #3383, 8 pages.

Griesinger, David, "Measures of Spatial Impression and Reverberance based on the Physiology of Human Hearing," Proceedings of the 11th International Audio Engineering Society Conference, May 1992, pp. 114-145, (33 pgs.).

Griesinger, David, "Multichannel Sound Systems and Their Interaction with the Room," *Presented at the 15th International Conference of the Audio Engineering Society*, Copenhagen, Oct. 1998, pp. 159-173, (16 pgs.).

Griesinger, David, "How Loud is My Reverberation?," *Presented at the 98th Convention of the Audio Engineering Society*, Paris, Feb. 1995, 7 pages.

Griesinger, David, "Spaciousness and Localization in Listening Rooms and Their Effects on the Recording Technique," *J. Audio Eng. Soc.*, vol. 34, No. 4, 1986, pp. 255-268, (16 pgs.).

Griesinger, David, "The Psychoacoustics of Apparent Source Width, Spaciousness, and Envelopment in Performance Spaces," *Acta Acoustics*, vol. 83, 1997, pp. 721-731, (11 pgs.).

Griesinger, David, "The Theory and Practice of Perceptual Modeling—How to Use Electronic Reverberation to Add Depth and Envelopment Without Reducing Clarity," material from David Griesinger's Internet Home Page, obtained from the Internet at: <www.world.std.com/~griesngr...>, undated but prior to May 2002, 28 pgs.

Griesinger, David, "Internet Home Page," obtained from the Internet at: <www.world.std.com/~griesnger/>, printed on Apr. 26, 2004, (9 pgs.).

Julia Jakka, "Binaural to Multichannel Audio Upmix", Helsinki University of Technology, Jun. 6, 2005.

Allen, J.B. et al., Multimicrophone Signal-Processing Technique to Remove Room Reverberation From Speech Signals, Oct. 1977, pp. 912-915, vol. 62, No. 4, Acoustical Society of America.

Tsoukalas, Dionysis E. et al., Speech Enhancement Based on Audible Noise Suppression, Nov. 1997, pp. 497-512, vol. 5, No. 6, IEEE.

Bradley, John S. et al., The Influence of Late Arriving Energy on Spatial Impression, Apr. 1995, pp. 2263-2271, Acoustical Society of America.

Widrow, Bernard et al., Adaptive Noise Cancelling: Principles and Applications, Dec. 1975, pp. 1692-1717, vol. 63, No. 12, IEEE.

Ramarapu, Pavan K. et al., Methods for Reducing Audible Artifacts in a Wavelet-Based Broad-Band Denoising System, Mar. 1998, pp. 178-190, vol. 46, No. 3, Audio Engineering Society.

Sambur, Marvin R., Adaptive Noise Canceling for Speech Signals, Oct. 1978, pp. 419-423, vol. ASSP-26, No. 5, IEEE.

Thiede, Thilo et al., PEAQ- The ITU Standard for Objective Measurement of Perceived Audio Quality, Jan. Feb. 2000, pp. 3-29, vol. 48, No. 1/2, Audio Engineering Society.

Johnston, James D., Transform Coding of Audio Signals Using Perceptual Noise Criteria, Feb. 1998, pp. 314-323, vol. 6, No. 2, IEEE.

Todd, Craig C. et al., AC-3: Flexible Perceptual Coding for Audio Transmission and Storage, $96^{th}$ Convention Feb. 26-Mar. 1, 1994, pp. 1-17, AES.

Levine, Scott N., A Switched Parametric and Transform Audio Coder, 1999, pp. 1-4, ICASSP, Phoenix, Arizona.

F. J. Harris, "On the Use of Windows for Harmonic Analysis with the Discrete Fourier Transform," Prod. IEEE, vol. 6, No. 1, Jan. 1978, pp. 51-83.

Eargle, John. The Microphone Book. Focal Press, 2004. pp. 50-90.

Wu et al. "A One-Microphone Approach for Reverberant Speech Enhancement", 2003 IEEE International Conference on Acoustics, Speech and Signal Processing, pp. I-844 to I-847, Apr. 6-10, 2003, Hong Kong.

Baskind et al. "Pitch-Tracking of Reverberant Sounds, Application to Spatial Description of Sound Scenes", AES $24^{th}$ International Conference—Multichannel Audio: The New Reality, Jun. 26-28, 2003, Banff, Alberta, Canada.

Theile, Gunther "Wave Field Synthesis—a Promising Spatial Audio Rendering Concept", Proc. F the $7^{th}$ Int. Conference on Digital Audio Efects, Oct. 5-8, 2004, pp. 125-132.

Japanese Office Action mailed May 18, 2011, Japanese Application No. 2009-501806 (8 pgs.).

Office Action mailed May 26, 2011, U.S. Appl. No. 12/054,388 (20 pgs.).

\* cited by examiner

SYSTEM FOR EXTRACTING AND CHANGING THE REVERBERANT CONTENT OF AN AUDIO INPUT SIGNAL

FIELD OF THE INVENTION

This invention relates to decomposition and alteration of reverberant and non-reverberant components of an input signal and more particularly to reducing or increasing the perceptibility of a component of an input signal. It has particular application to reducing or increasing reverberation in an audio signal.

There are numerous cases where the reverberation found in a signal is not appropriate for its final use and therefore we would like to have a means of altering the reverberation. Furthermore we would like to be able to modify this reverberation without having to directly measure the acoustic space in which it was recorded.

BACKGROUND OF THE INVENTION

Almost all audio signals consist of a combination of an original dry signal and reverberation. The reverberation results from the dry signal being passed through a reverberant system. For example, consider a singer performing in a concert hall. In this example the singer's voice is the dry signal and the concert hall is the reverberant system. If we place a microphone at some location in the concert hall to record the resulting sound, we will have the dry voice signal with the reverberant characteristics of the concert hall superimposed upon it. That is, the microphone captures a mixture of the direct sound component due to the singer, and the reverberant component due to the sound passing through the concert hall.

Once the original dry signal has the reverberant characteristics of an acoustic space superimposed upon it, it is extremely difficult to recover the original dry signal (or the direct signal component). Similarly, it is extremely difficult to alter the characteristics or level of the reverberant component. The difficulty is due in part to the fact the reverberation is dependent on the original dry signal. That is the reverberation is created from the original dry signal.

Moreover, we do not typically have access to any relevant information regarding the reverberant system. Using the example of the singer in a concert hall, the microphone does not record the acoustic details of the concert hall directly. Rather it records the sound of the singer's voice with the acoustic characteristics of the concert hall superimposed upon it.

In some applications such as musical recordings a certain amount of reverberation is highly desirable since it can provide a subjectively pleasing extension of each note as well as a sense of depth and envelopment. Of course, some acoustic spaces (e.g. concert halls) are more subjectively pleasing than others. However, one does not typically have access to the most subjectively pleasing acoustic spaces and so the reverberant component of the recording may not be as good as one would like. That is the reverberation may not be entirely appropriate for that recording. At present, there is not much that can be done to alter the reverberant component of the recording in this case. If the recording lacks reverberant energy, then one can add more reverberant energy by processing the recording through an artificial reverberation device. However, the reverberation produced by these devices does not tend to sound natural and is unlikely to complement the reverberation that is already present in the recording. Conversely, if the recording has too much reverberation, then there is not much that can be done presently to reduce the level of the reverberant component. If the recording has the right amount of reverberation, but not the right characteristics, then there is not much that can be done presently to alter the characteristics of the reverberation. In each of these cases it would be highly beneficial to be able to modify the direct sound component as well as the level and characteristics of the reverberant energy in order to obtain the appropriate reverberant characteristics.

In other applications even a modest amount of reverberation is not appropriate since it degrades the clarity and intelligibility of the signal. For example, in applications such as teleconferencing where a hands-free telephone is often used, the reverberation of the office or conference room can have the undesirable effect of making the speech signal sound "hollow". This is often referred to as the rain barrel effect. In other related applications such as security, surveillance and forensics, the reverberation is highly undesirable since it can reduce the intelligibility of speech signals. However in such situations it is typically impossible to have any control over the reverberant characteristics of the acoustic space. In speech recognition systems the reverberation reduces the system's ability to correctly identify words and may thus reduce the recognition rate. If the recognition rate becomes too low then the speech recognition system may be rendered unusable. Reverberation can cause unique difficulties for hearing impaired people since the undesirable effects of the reverberation are often compounded by their hearing impairment. The negative effects of reverberation on speech intelligibility are often more severe for people with hearing impairments. When a hearing aid device amplifies an acoustic signal to make it more audible, it amplifies both the direct sound component and the reverberant component. Therefore, amplifying the signal does not help to overcome the negative effects of the reverberation. In each of these applications it would be highly beneficial to be able to reduce the level of the reverberant component so that it is at an appropriate level with respect to the direct sound component. One common approach to try to reduce the amount of reverberation in an audio signal is to use a directional microphone or a microphone array. The directional microphone and microphone array accept sounds arriving from certain directions and reject sounds coming from other directions. Therefore, if the microphone is placed appropriately then it will accept the desired dry signal while rejecting some portion of the reverberation.

Successful use of a directional microphone or microphone array requires that one knows where the desired signal is located. If the location is not known, or if it is changing over time, then this approach may not work satisfactorily since the desired signal may be rejected. Also, this approach may not be appropriate in certain applications due to the physical size of the microphone array, the increase in the amount of hardware resources required (e.g. microphones, amplifiers, etc), and the resultant increase in cost. Instead, it would be highly beneficial to be able to blindly reduce the level of the reverberant component to an appropriate level using a single non-directional microphone, without any knowledge of the acoustic space, and without any knowledge of the location of the source.

In film and television productions it is important for the sounds that we hear (e.g. dialog and sound effects) to have reverberant characteristics that are appropriate for the image that we see on the screen. For example if the image indicates that the scene is taking place in a small room, then the sound should have the reverberant characteristics of a small room even though it may actually have been recorded on a large sound stage. The term "room tone" is often used in film and television productions to describe the acoustic characteristics of the acoustic space. In general the sounds in film and television productions are often recorded in very different locations. For example parts of the dialog may be recorded at the time of filming, whereas other parts of the dialog may be recorded later in a recording or "dubbing" studio. Here the actors recite their lines while they watch a video of their performance. This process is known as automatic dialog replacement (ADR) and is an extremely common practice. In order for the various parts of the dialog to sound natural and realistic, it is necessary to match the room tone (reverberant characteristics) of the different recordings so that they sound as though they were all recorded in the same acoustic space. Moreover, one usually wants to make the recordings sound like they were recorded in a very specific acoustic space, having a very specific room tone.

In the ADR example the recordings are often very dry since the recording or dubbing studio is usually a carefully controlled acoustic space. That is there is typically very little reverberation in the recordings. In this case one may wish to impose the reverberant characteristics of a specific room onto the recordings. This may be quite difficult if the acoustic characteristics of the room are not directly available. However, other recordings that were recorded in that room may be available. In this case it would be highly useful to be able to extract the acoustic characteristics of an acoustic space from a recording. It would further be useful to be able to impose the reverberant characteristics of the appropriate acoustic space onto a recording.

In situations where different parts of the dialog have been recorded in different acoustic spaces that each have a significant amount of reverberation, then the task is to somehow match the reverberant characteristics of the different recordings. To do this one must first remove the reverberant characteristics of the room in which the recording was done before applying the reverberant characteristics of the appropriate acoustic space. As indicated above, this is a difficult task that has not been satisfactorily resolved to date. In this situation it would be very useful to be able to remove the acoustic characteristics of a recording and then apply the acoustic characteristics of an appropriate acoustic space.

In one class of situations the reverberation found in an audio signal is inappropriate in that it limits one's ability to process the signal in some way. For example in an audio data reduction system the goal is to compress the signal so that a smaller amount of data is used to store or transmit a signal. Such systems use an encoder to compress the signal as well as a decoder to later recover the signal. These audio data reduction systems can be "lossless" in which case no information is lost as a result of the compression process, and so the original signal is perfectly recovered at the decoder. Other versions are "lossy" and so the signal recovered at the decoder is not identical to the original input signal. Audio data reduction systems rely on there being a high degree of redundancy in the audio signal. That is they operate best on audio signals that are "predictable". However, reverberation in an audio signal reduces its predictability. There are currently no means of overcoming the effects of reverberation in order to improve the performance of an audio data reduction system. It would be highly desirable to be able to decompose a signal into its direct sound component and reverberant component prior to compressing it at the encoder, and then retrieve the reverberant signal after decoding the compressed signal.

Another example where reverberation limits one's ability to process a signal is audio watermarking. In audio watermarking the goal is to hide information inside an audio signal. This hidden information may be used for such things as copyright protection of a song. Audio watermarking systems operate by making small modifications to the audio signal. These modifications must be inaudible if the watermark is to be successful. Here, one would like to make a modification at a very specific point in time in the song. However this modification may become audible if the direct sound component and the reverberant component no longer match each other as a result of the modification. It would be highly desirable to be able to remove the reverberant component of an audio signal, insert an audio watermark, and then add the reverberant component back to the signal.

In another class of situations the reverberation found in a signal becomes inappropriate as a result of some processing. For example it is common to process a signal in order to remove background noise or to alter its dynamic range. This processing often alters the relation between the direct sound component and the reverberant component in the recording such that it is no longer appropriate. There are currently no means of correcting the reverberant component after this processing.

It is often not convenient or impossible to measure the acoustic characteristics of an acoustic space. Using our earlier example, while we can have easy access to a recording of a singer in a concert hall, we very rarely have access to concert hall itself. And, even if we did have access to the concert hall, we wouldn't likely be able to reproduce the acoustic conditions at the time of the recording (e.g. location of the singer and the microphone, presence of an audience, etc.). Therefore we would like to be able to extract a description of the reverberant system from a recording (or real-time signal) that was made within that reverberant system. Most importantly we would like to be able to extract a description of the perceptually relevant aspects of the reverberant system. To date, there is no method that adequately satisfies this need. This description of the reverberant system may be used to analyze the reverberant system, as part of a system for modifying or reducing the reverberant characteristics in a recording, or as part of a system for imposing reverberant characteristics onto a recording.

The earliest audio recordings (film, music, television, etc.) were monophonic. That is they were recorded onto only one channel. Stereo audio recordings are typically more pleasing since they are better at reproducing the spatial aspects of the reverberant characteristics of the acoustic space. Numerous processes have been developed to try to convert monophonic recordings to a stereophonic format. These techniques are limited by the fact that they process both the direct sound component as well as the reverberant component. These techniques could be improved dramatically if they could process the direct sound component and reverberant component separately. At present, there is no satisfactory way to decompose the signal into a direct sound component and reverberant component so that they may be processed separately.

Multichannel surround systems are becoming increasingly popular. Whereas a stereo system has two channels (and thus two loudspeakers) a multichannel surround system has multiple channels. Typical multichannel surround systems use five channels and hence five loudspeakers. At present the number of multichannel audio recordings available is quite limited. Conversely, there are a very large number of mono and stereo recordings available. It would be highly desirable to be able to take a mono or stereo audio signal and produce a multichannel audio signal from it. Current methods for doing this use an approach called "matrix decoding". These methods will take a stereo recording and place different parts of the recording in each of the channels of the multichannel system. In the case of music recordings, some of the instruments will appear to be located behind the listener. This is not a desirable result in some situations. For example when playing an orchestral recording one does not typically want some of the instruments to appear to be located behind the listener. Rather, one typically wants the instruments to appear to be located in front of the listener, with the concert hall reverberation appearing to arrive from all around the listener.

One way to approach this problem is to send the original stereo signal to the front loudspeakers while also processing the stereo signal through an artificial reverberation device. The outputs of the artificial reverberation device are intended to provide a simulation of the concert hall reverberation, and they would be sent to the rear (surround) loudspeakers. This approach is not satisfactory for several reasons. First, the approach adds additional reverberation on top of the reverberation already present in the stereo signal. Therefore, this approach can make the overall amount of reverberation inappropriate for that particular recording. Moreover, the reverberation added by the artificial reverberation device is not likely to match the characteristics of the reverberation in the stereo recording. This will make the resultant multichannel signal sound unnatural. A better approach would be to decompose the stereo signal into its direct sound component and its reverberant component.

With the original signal decomposed into direct and reverberant components, one could choose to create multichannel audio signals by processing the direct sound component through a multichannel artificial reverberation device. This method would avoid the problem of adding additional reverberation since the reverberant component of the signal has been removed. This method would also avoid the problem of a mismatch between the artificial reverberation and the reverberation in the original recording.

Alternatively, with the original signal decomposed into direct and reverberant components, one could choose to create multichannel audio signals by sending the direct component to the front loudspeakers. This would preserve the frontal placement of the instruments in the reproduced sound field. The reverberant component of the original signal could either be sent to the rear loudspeakers, or it could decomposed into sub-components and distributed across all of the loudspeakers in an appropriate manner. This approach would have the significant advantage of creating a multichannel signal entirely from the components of the original recording, thus creating a more natural sounding result. There are no methods currently available that allow a signal to be decomposed into direct and reverberant components so that multichannel signals can be generated in this manner.

In general, if one had a recording of a sound in a reverberant system and one could somehow directly measure the acoustic characteristics of that reverberant system, then it would be possible to mathematically invert the reverberant system and completely recover the original dry sound. This process is known as inverse filtering. However inverse filtering cannot be done without precise measurements of the exact acoustic characteristics of the reverberant system. Moreover, the resulting inverse filter is specific to that one set of acoustic characteristics. It is not possible to use inverse filtering to recover the original dry signal from a recording in a given reverberant system using the acoustic characteristics measured from a different reverberant system. For example, an inverse filter derived for one location in a room is not valid for any other location in the same room. Other problems with inverse filters are that they can be computationally demanding and they can impose a significant delay onto the resulting signal. This delay may not be acceptable in many real-time applications. Therefore, we would like to have a means of achieving the benefits of inverse filtering while overcoming the limitations that make it impractical in most real-world applications. There are presently no means available to adequately perform this task.

As described above there are numerous situations where the reverberation found in an audio signal is not appropriate for its intended final application. Therefore, there is a need to be able to modify the direct sound component and/or the reverberant sound component of the audio signal. Furthermore we would like to be able to modify this reverberation without having to directly measure the acoustic space in which it was recorded. These problems have not been satisfactorily solved to date.

SUMMARY OF THE INVENTION

In accordance with one aspect of this invention, the present invention addresses the above need by providing a method and apparatus for identifying and altering the reverberant component of an audio signal. The reverberant component of a signal is determined by the reverberant system in which the signal was recorded or captured. The characteristics of the reverberant system are fully described by its impulse response (between the sound source and the microphone). An impulse response can also be viewed in the frequency domain by calculating its Fourier transform (or some other transform). The Fourier representation provides both a magnitude response and a phase response. The invention relies on dividing the impulse response representing the reverberant system into blocks, where each block represents a portion of the impulse response. It further relies on estimating the impulse response by a magnitude response estimate of the frequency domain representation of each of the blocks. Since the human auditory system is relatively insensitive to phase over short durations, the magnitude response based representation forms a perceptually adequate estimate of the true impulse response.

In accordance with one aspect of the invention, methods are presented for deriving block-based estimates of the magnitude response based representation of the impulse response based on tracking changes in signal level across both time and frequency. The methods derive the block-based estimates of the magnitude response of the impulse response directly from the signal, and do not require direct measurement of the impulse response. The methods rely on the fact that, at any given point in time, the energy in the signal is composed of the energy in the current dry signal plus the sum of the energies in the reverberant components of all previous signals.

The invention uses the block-based estimates of the magnitude response of the impulse response to identify and extract the energy related to the reverberant component of a signal.

According to another aspect of the invention, the characteristics of the reverberant component of a signal can be altered by adjusting the block-based estimates of the magnitude response of the impulse response.

According to another aspect of the invention, the reverberant characteristics of a source reverberant system derived from a first signal can be applied to a second signal.

The various aspects of the invention allow the reverberant component of a signal to be altered so that it is more appropriate for its intended final application.

The method and apparatus may also include a perceptual model. The primary purpose of the perceptual model is to reduce the audibility of any artifacts resulting from the processing. This may be done by determining which portions of the reverberant signal are masked by other portions of the reverberant signal. Masking is the phenomenon that occurs in the human auditory system by which a signal that would otherwise be audible is rendered inaudible by the presence of another signal. By including a perceptual model in the processing, only the audible portion of the reverberant signal is extracted, thus reducing the amount by which the frequencies of the original signal are modified. The perceptual model also provides interactions of internal parameters across time and frequency to reflect the masking properties of the ear. As a result, the artifacts that result from modifying these frequencies are reduced.

The method and apparatus may also include one or more source models. The purpose of one source model is to provide a model of the acoustic characteristics of the original dry sound source. The purpose of the second source model is to provide a model of the characteristics of the reverberant system. By knowing the acoustic characteristics of the original dry signal and the reverberant system, better decisions can be made regarding which portions of the input signals are due to the dry signal and which are due to the reverberation. For example, most reverberant systems (rooms) can be well-modeled as a system that decays exponentially over time.

DETAILED DESCRIPTION

The present invention provides a means of altering the reverberant component of a signal. This is accomplished generally by first obtaining a perceptually relevant estimate of the frequency-domain representation of the impulse response of the underlying reverberant system. Using this estimate of the impulse response, the signal is processed so as to extract the reverberant component of the signal, thus obtaining an estimate of the dry signal and an estimate of the reverberant signal. If desired, further processing may be applied to the dry signal and the reverberant signal.

The impulse response of an acoustic space provides a complete description of the reverberant system. Using the earlier example of a singer in a concert hall, the reverberant system (in this case, the concert hall) can be completely described by the impulse response between the singer and the recording microphone. It is well appreciated that various acoustic spaces (e.g. a concert hall versus a bathroom) can have very different perceived reverberant conditions. These differences are described by the differences in the impulse responses of the various spaces.

Figure 1:
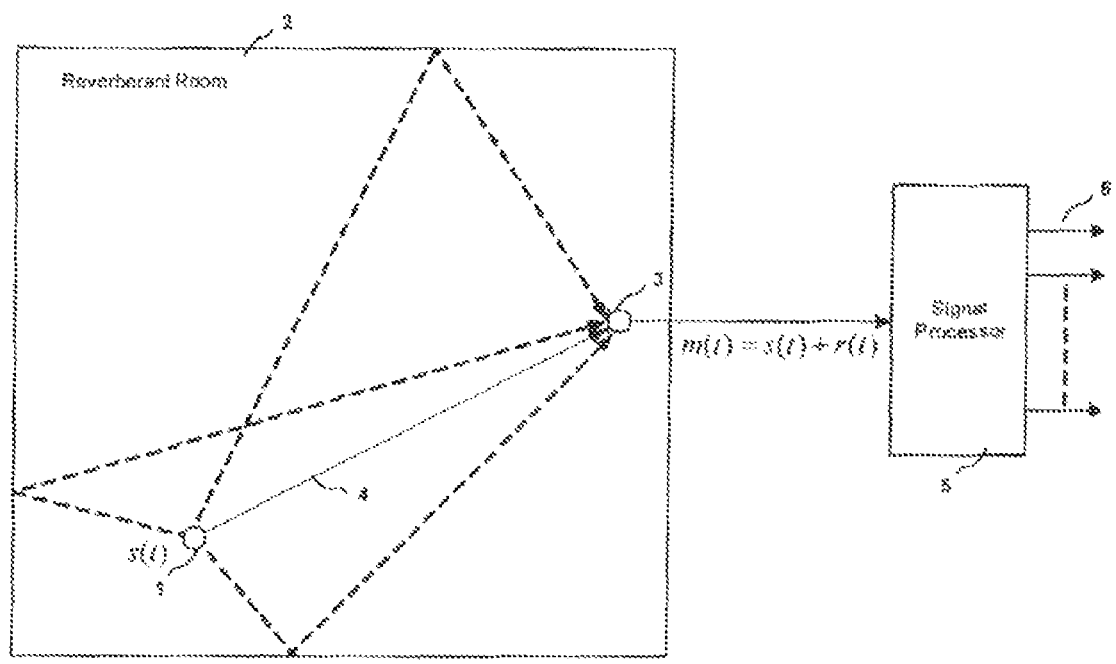
FIG. 1 depicts a reverberant room with a sound source and a receiving microphone.

The impulse response of a reverberant system can be better understood by considering FIG. 1 which shows a sound source s(t) 1 in a reverberant room 2, with a recording microphone 3. If the sound source consists of an impulsive sound then what is recorded at the microphone will be the impulse response of the reverberant system between the sound source and the microphone. The impulse response includes the direct sound component 4, which is the first sound to reach the microphone since it has the shortest distance between the sound source and the microphone. Following the direct sound component will be a series of reflected sounds (reflections) as shown by the dotted lines in the figure. The time-of-arrival and the amplitude of the reflections determine the characteristics of the reverberant system. The reflections that arrive after the direct sound component make up the reverberant component. Therefore, one effect of the reverberant system is to add reverberation to the original dry signal. That is, the reverberation adds energy to the original dry signal.

Mathematically, this is represented as $m(t)=s(t)+r(t)$, where $r(t)$ is the reverberant signal component that results from the signal $s(t)$ passing through the reverberant system described by the impulse response $h(t)$.

Figure 2:
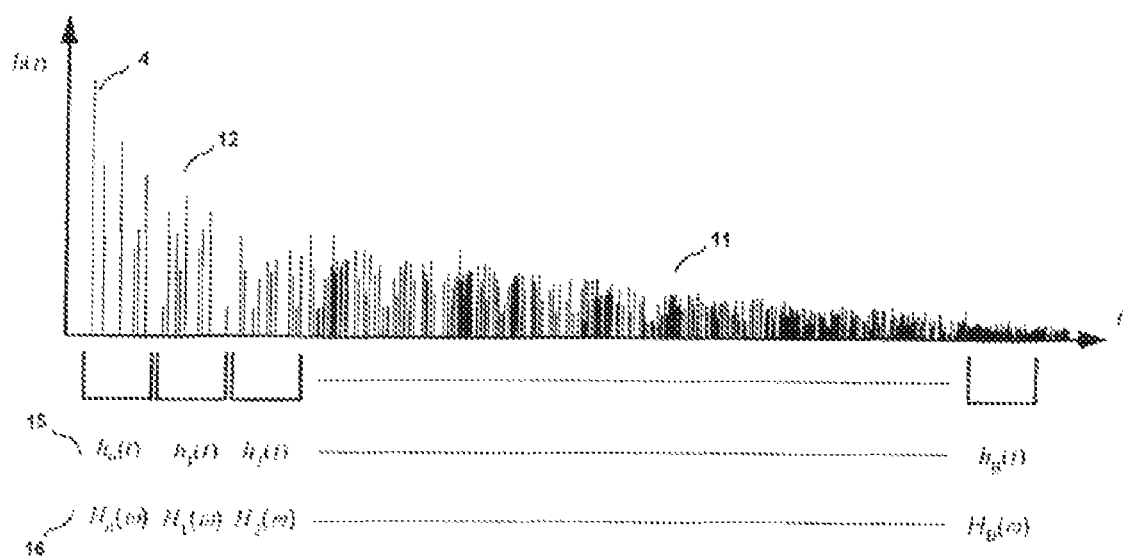
FIG. 2 depicts the components of an impulse response with representation of the block-based decomposition.
Figure 3:
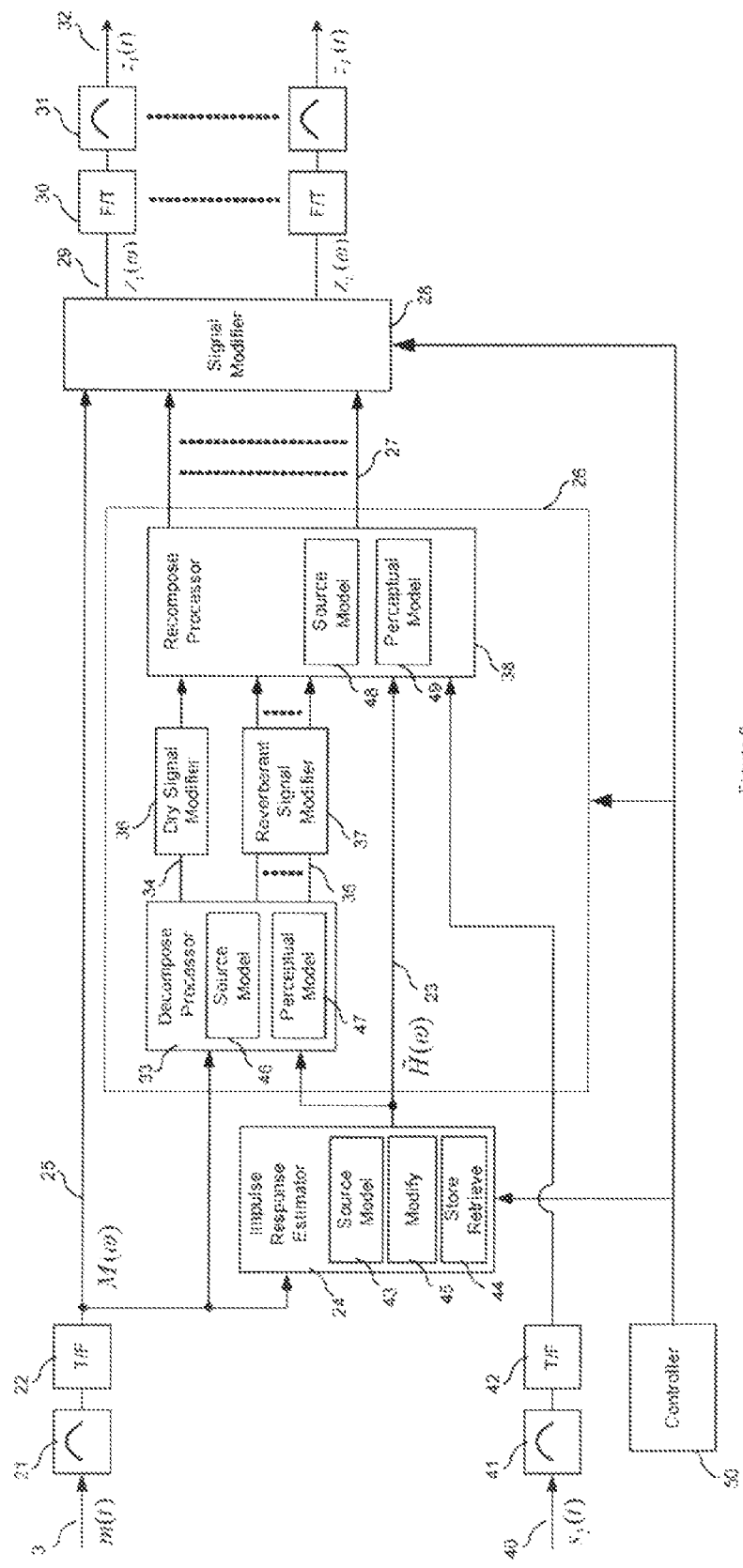
FIG. 3 illustrates a schematic diagram of Signal Processor 5.

An example of an impulse response is given in FIG. 2. The first vertical line represents the direct sound 4 while the remaining lines represent the reflections. The height of each line indicates its amplitude and its location on the time axis indicates its time-of-arrival. As time goes on the number of reflections increases to the point where it is no longer possible to identify individual reflections. Eventually the reflections evolve into a diffuse exponentially decaying system. This is typically referred to as the reverberant tail 11 of the impulse response.

The so-called early reflections 12 arrive soon after the direct sound component and have a different perceptual effect than the reverberant tail. These early reflections provide perceptual clues regarding the size of the room and the distance between the source and the microphone. The early reflections are also important in that they can provide improved clarity and intelligibility to a sound. The reverberant tail also provides perceptual clues regarding the acoustic space. It is common to divide an impulse response of an acoustic space into three conceptual parts—the direct sound 4, the early reflections 12, and the reverberant tail 11.

It is important to note that an acoustic space does not have a single impulse response. Using the example of FIG. 1 we see that there is an impulse response for the room when the sound source 1 is located at a particular location and the microphone 3 is located at a given location. If either the sound source or microphone is moved (even by a small amount) then we have a different impulse response. Therefore, for any given room there are effectively an infinite number of possible impulse responses since there are effectively an infinite number of possible combinations of locations of 1 and 3.

An impulse response can also be viewed in the frequency domain by calculating its Fourier transform (or some other transform), and so a reverberant system can be described completely in terms of its frequency domain representation $H(\omega)$. The variable $\omega$ indicates frequency. The Fourier representation of the impulse response provides us with both a magnitude response and a phase response. Generally speaking the magnitude response provides information regarding the relative levels of the different frequency components in the impulse response, while the phase response provides information regarding the temporal aspects of the frequency components. Moving the sound source 1 or the microphone 3 from one location in a room to a nearby location does not tend to have much effect on the magnitude response, whereas it does tend to have a quite dramatic effect on the phase response. That is, nearby impulse responses in a room tend to have similar magnitude responses, but will have very different phase responses.

Day to day experience tells us that we are not particularly sensitive to the differences in the impulse responses within a given room. For example, as we move around in a room while listening to someone talk we do not tend to hear dramatic changes in the sound of that person's voice even though the impulse response is changing continuously as we move. The reason that we do not hear dramatic differences is because the ear is primarily sensitive to the gross features of an impulse response and is not sensitive to the fine detail. More specifically, the ear is far less sensitive to changes in the phase response as compared to changes in the magnitude response of an impulse response. In general, the ear is quite insensitive to phase over short time periods (D. L. Wang and J. S. Lim, "The unimportance of phase in speech enhancement," IEEE Trans. Acoust. Speech, Signal Processing, vol. ASSP-30, no. 4, pp. 679-681, August 1982). As noted above, the various impulse responses in a room tend to have similar magnitude responses, but will have very different phase responses.

The present invention operates by producing a frequency domain estimate of the estimate of the magnitude of the reverberant energy in the input signal. This estimate of the magnitude of the reverberant energy is subtracted from the input signal, thus providing an estimate of the magnitude of the input signal. The phase of the reverberant input signal is used to approximate the phase of the original dry signal. If this process is done using the entire impulse response as a whole, then it is likely that severe time-domain artifacts would be audible in the processed signal. Therefore, in the present invention, the estimate of the overall impulse response is divided into short blocks, and the processing is performed in a block-based manner. The length of the blocks is chosen to be short enough that the ear does not perceive any time-domain artifacts due to errors in the phase of the processed output signals.

In general, in the present invention, a signal processor 5 operates on the input signal m(t) 3 to decompose it into its different components 6. These components may consist of an estimate $\tilde{s}(t)$ of the original dry signal s(t) 1 and an estimate $\tilde{r}(t)$ of the reverberant component r(t). The estimate $\tilde{r}(t)$ of the reverberant component may be further decomposed into subcomponents representing estimates $\tilde{r}_1(t), \tilde{r}_2(t), \ldots, \tilde{r}_K(t)$, of the different parts of the reverberant signal. In general, the signal processor 5 may also modify any or all of the dry and reverberant signal component estimates. The invention operates on m(t) in the frequency domain. The input signal m(t) 3 is converted to a frequency domain representation by applying an overlapping analysis window 21 to a block of time samples. The time-to-frequency domain processor 22 produces an input spectrum in response to input time samples. To achieve time-to-frequency domain conversion, the time-to-frequency domain processor may execute a Discrete Fourier Transform (DFT), wavelet transform, or other transform, or may be replaced by or may implement an analysis filter bank. In this embodiment, a DFT is used. It will be appreciated that the input signal m(t) does not need to be derived from a microphone as depicted in FIG. 1. The invention can operate on any audio signal regardless of how it was produced.

The impulse response estimator 24 operates on the frequency domain representation of the input signal M($\omega$) 25 to produce a perceptually relevant estimate $\tilde{H}(\omega)$ 23 of the frequency domain representation of the impulse response H($\omega$). Generally, the impulse response estimator 24 operates on the input signal to produce a block-based estimate of H($\omega$). The block-based estimate of the impulse response consists of a plurality of block estimates $\tilde{H}_0(\omega), \tilde{H}_1(\omega), \tilde{H}_2(\omega), \ldots$ 16 which correspond to frequency domain estimates of the blocks of the impulse response $h_0(t), h_1(t), h_2(t), \ldots$ 15 as shown in FIG. 2.

The reverberation adjustment processor 26 is operable to adjust frequency components of the input signal spectrum M($\omega$) in response to one or more frequency-domain block estimates 16 of the impulse response to produce one or more reverberation-adjusted frequency spectra 27 including adjusted frequency components of the input signal spectrum M($\omega$). Generally, the reverberation adjustment processor 26 derives one or more reverberation-adjusted frequency spectra 27 that will pass, amplify, or attenuate a component of the input signal based on whether that component is part of the original dry signal or part of the reverberant signal.

The signal modifier 28 is operable to modify and mix frequency components of the reverberation-adjusted frequency spectra 27 as well as the input signal spectrum 25 to produce one or more output frequency spectra $Z_1(\omega), Z_2(\omega), \ldots, Z_L(\omega)$ 29.

The frequency-to-time domain processors 30 are operable to produce output frames of time samples $z_1(t), z_2(t), \ldots, z_L(t)$ 32 in response to the output frequency spectra. The frequency-to-time domain processors generally perform the inverse function of the time-to-frequency domain processor 22. Consequently, in the preferred embodiment, each frequency-to-time domain processor performs an Inverse Discrete Fourier Transform (IDFT).

The decompose processor 33 uses the block-based estimate $\tilde{H}(\omega)$ 23 of the frequency domain representation of the impulse response H($\omega$) and operates on the frequency domain representation of the input signal M($\omega$) 25 to produce an estimate of the original dry signal $\tilde{S}(\omega)$ 34 and estimates $\tilde{R}_1(\omega), \tilde{R}_1(\omega), \ldots, \tilde{R}_K(\omega)$ 35 of one or more components of the reverberant signal.

The Dry Signal Modifier 36 is operable to adjust frequency components of the estimate $\tilde{S}(\omega)$ 34 of the original dry signal to produce a modified estimate $\tilde{S}'(\omega)$ of the original dry signal. The Reverberant Signal Modifier 37 is operable to independently adjust frequency components of one or more of the estimates $\tilde{R}_1(\omega), \tilde{R}_1(\omega), \ldots, \tilde{R}_K(\omega)$ of the reverberant signal components to produce modified estimates of the reverberant signal components.

Generally, the recompose processor 38 takes the modified estimate $\tilde{S}'(\omega)$ of the original dry signal and the modified estimates $\tilde{R}_1'(\omega), \tilde{R}_1'(\omega), \ldots, \tilde{R}_K'(\omega)$ of the reverberant signal components and produces one or more reverberation-adjusted frequency spectra 27.

A second input signal $s_2(t)$ 40 may be provided to the recompose processor in order to add reverberation to the second input signal. The input signal $s_2(t)$ 40 is converted to a frequency domain representation by applying an overlapping analysis window 41 to a block of time samples. The time-to-frequency domain processor 42 produces an input spectrum in response to the input time samples. The characteristics of the added reverberation are determined by the block-based estimate of the impulse response 23.

The performance of the invention may be improved by including one or more source models 43 in the impulse response estimator 24. A source model may be used to account for the physical characteristics of the reverberant system. For example, the response of a reverberant system (room) tends to decay exponentially over time.

The block-based estimate derived by the impulse response estimator 24 can be stored 44 and retrieved for later use. The impulse response modifier 45 is operable to independently adjust the frequency components of the block-based estimates of the impulse response to produce modified block-based estimates of the impulse response.

The performance of the decompose processor 33 may be improved by including a source model 46. One goal of a source model may be to account for the physical characteristics of the dry sound source when deciding how much a given frequency band should be attenuated or amplified. The performance of the decompose processor 33 may also be improved by including a perceptual model 47. One goal of the perceptual model is to limit the amount by which frequency bands are modified such that, in extracting the dry signal, an unwanted reverberant component is only attenuated to the point where it is masked by the dry signal. Similarly, in extracting the reverberant signal, an unwanted dry signal component is only attenuated to the point where it is masked by the reverberant signal. In practice, aspects of the perceptual model and the source model may be combined.

The performance of the recompose processor 38 may be improved by including a source model 48. One goal of a source model may be to account for the physical characteristics of the dry sound source when deciding how much a given frequency band should be attenuated or amplified. The performance of the decompose processor 38 may also be improved by including a perceptual model 49. One goal of the perceptual model is to limit the amount by which frequency bands are modified such that, in deriving the reverberation-adjusted spectra, unwanted components of the dry and reverberant signals are only attenuated to the point where they are masked by the desired signal components. In practice, aspects of the perceptual model and the source model may be combined.

In practice, aspects of the source models 46, 48 and the perceptual models 47, 49 may be combined and shared between the decompose processor 33 and the recompose processor 38.

The operations of the various parts of the invention are independently controllable by the controller 50.

Preferred Embodiment of the Present Invention

The following describes a preferred embodiment for decomposing an input signal into its original dry signal component and reverberant component. The reverberant component is further decomposed into multiple sub-components. This preferred embodiment would be used in numerous applications including altering a speech or music signal to obtain the desired reverberant characteristics, enhancing the intelligibility of a speech signal, and creating additional audio channels from a monophonic, stereo or multichannel input signal.

The preferred embodiment is described for the case where the input signal is monophonic. In describing this embodiment it is assumed that the input signal m(t) 3 consists of a dry sound source s(t) 1 combined with a reverberant component r(t), where r(t) is the result of s(t) passing through the reverberant system having an impulse response h(t). It will be appreciated that the input signal 3 may be created by other means.

The input signal m(t) is converted to a frequency domain representation at 22. In this embodiment a fast implementation of the Discrete Fourier Transform (DFT) is employed with a 50% overlapping root-Hanning window 21. It will be appreciated by those skilled in the art that other frequency domain representations may be employed, including but not limited to the discrete cosine transform, or a wavelet transform. Alternatively, a filterbank may be employed to provide a frequency domain representation. It will be further appreciated that other windowing functions may be employed and that the amount of overlapping is not restricted to 50%. It will be appreciated that zero-padding of the time samples may be used in the time-to-frequency conversion to reduce any temporal aliasing artifacts that may result from the processing. The frequency domain representation of the input signal is M(ω) 25.

The Impulse Response Estimator 24 operates on the frequency domain representation of the input signal to produce a block-based estimate of the frequency domain representation of the impulse response $\tilde{H}(\omega)$ 23. As depicted in FIG. 2, the impulse response h(t) is divided into B+1 blocks consisting of $h_0(t), h_1(t), \ldots, h_B(t)$ 15 with corresponding frequency domain representations $H_0(\omega), H_1(\omega), \ldots, H_B(\omega)$ 16. In the preferred embodiment, all the blocks are the same size, each having a length of D. The Impulse Response Estimator produces a set perceptually relevant estimates of $H_0(\omega), H_1(\omega), \ldots, H_B(\omega)$. In this embodiment, these perceptually relevant estimates $\tilde{H}_0(\omega), \tilde{H}_1(\omega), \ldots, \tilde{H}_B(\omega)$ are based on estimates of the magnitudes of $H_0(\omega), H_1(\omega), \ldots, H_B(\omega)$ respectively.

Figure 4:
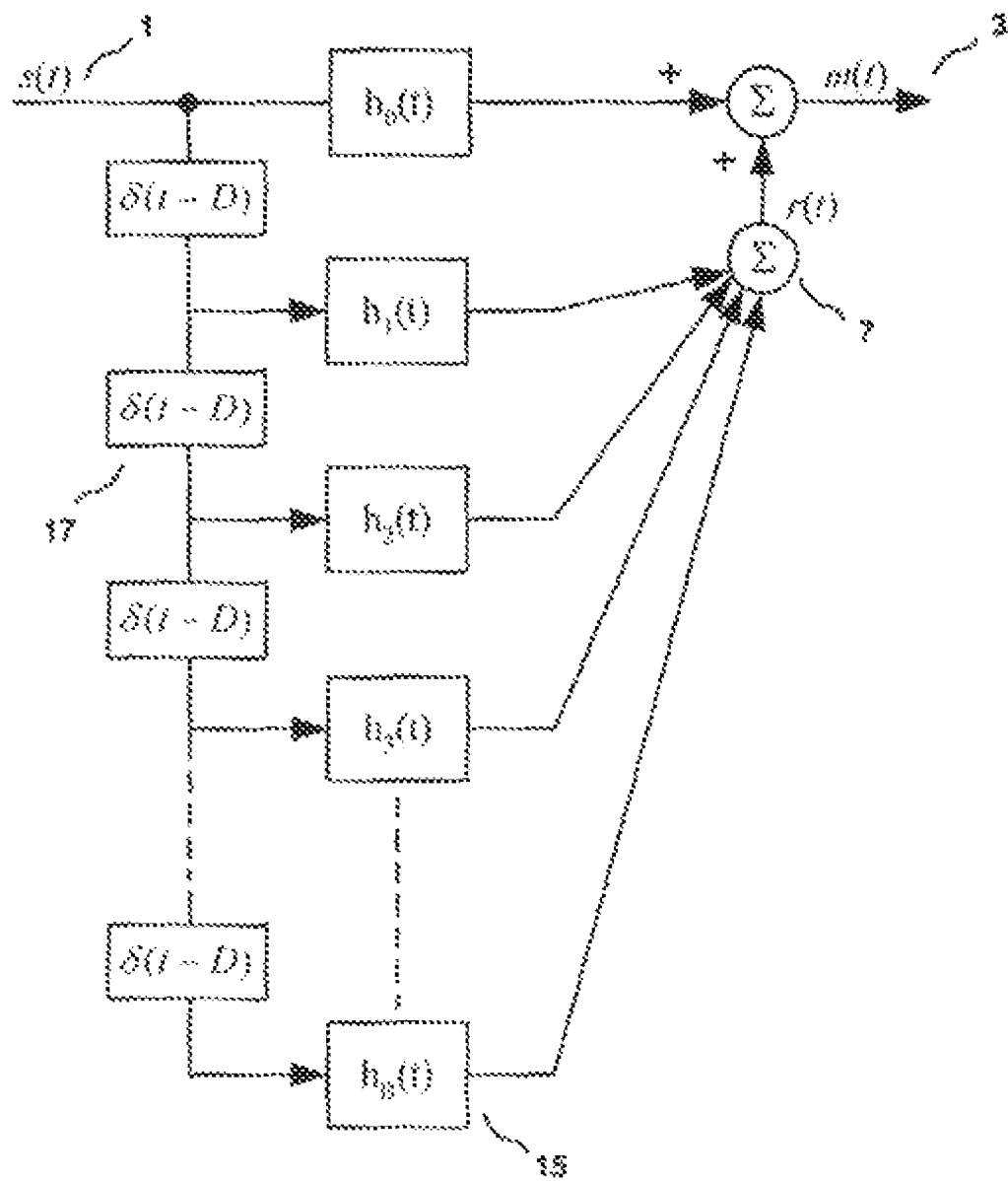
FIG. 4 depicts block-based convolution in the time domain.

It will be appreciated by those skilled in the art that the impulse response h(t) can be reasonably approximated by a finite impulse response (FIR) filter, provided that the filter is of sufficient length. Therefore, the signal m(t) can be obtained by processing the dry signal s(t) through an FIR filter having an impulse response equal to h(t). This filtering or convolution operation can be equivalently implemented using the block-based representation 15 of the impulse response. This block-based implementation is shown in FIG. 4.

The signal s(t) is processed through B+1 FIR filters having impulse responses equal to $h_0(t), h_1(t), \ldots, h_B(t)$. In order to time-align the outputs of these FIR filters, the signal s(t) is delayed by a series of delay elements δ(t−D) 17. Each delay element provides a delay of D samples, which corresponds with the length of the block FIR filters. Each delay element can be implemented as an FIR filter of length D having all but the last filter tap equal to zero and the last filter tap equal to 1. The block-based FIR filtering operation can be described mathematically as follows, $$m(t) = s(t)*h_0(t) + s(t)*\delta(t-D)*h_1(t) + \ldots + s(t)*\delta(t-BD)*h_B(t)$$

or equivalently, $$m(t) = \sum_{i=0}^{B} s(t) * \delta(t - iD) * h_i(t)$$

where * represents the convolution operation.

As indicated in FIG. 4, this mathematical description may be extended to show the direct signal component and the reverberant component explicitly as follows, $$m(t) = s(t) * h_0(t) + r(t)$$

$$m(t) = s(t) * h_0(t) + \sum_{i=1}^{B} s(t) * \delta(t - iD) * h_i(t)$$

where $$s(t) * h_0(t)$$

includes the direct signal component, and $$r(t) = \sum_{i=1}^{B} s(t) * \delta(t - iD) * h_i(t)$$

is the reverberant signal component 7. In practice, because $h_0(t)$ is of length D, we expect part of the initial portion of the reverberant signal to be in $s(t)*h_0(t)$. This is typically not a problem if D is chosen to be sufficiently short. If D is sufficiently short, then the portion of the reverberant signal within $s(t)*h_0(t)$ will not be audible due to the masking properties of the human auditory system. Therefore, it can be said that $s(t)*h_0(t)$ is a perceptually relevant representation of the direct signal component, while $r(t)$ is a perceptually relevant representation of the reverberant signal component.

Figure 5:
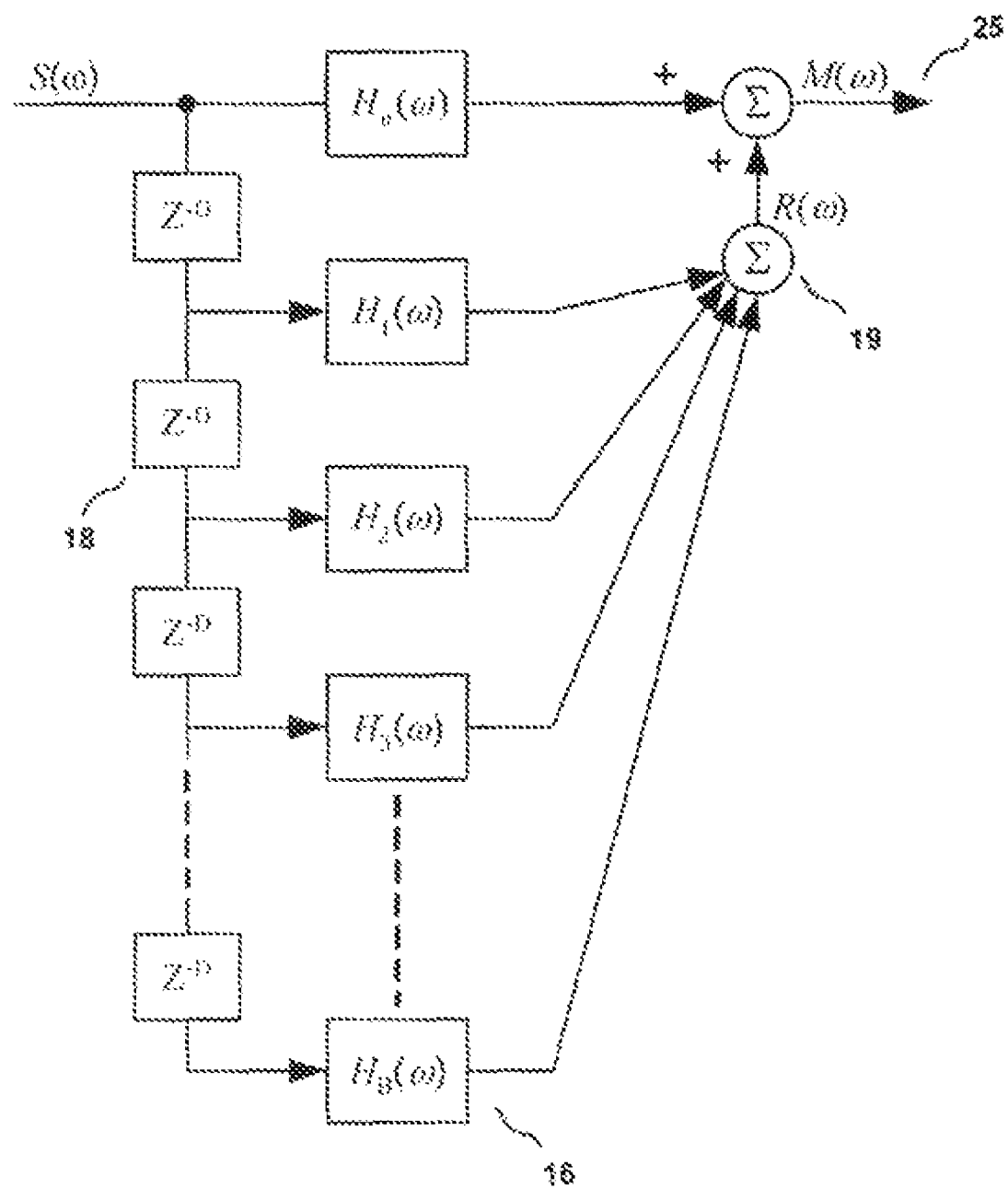
FIG. 5 depicts block-based convolution in the frequency domain.

It will be appreciated by those skilled in the art that convolution in the time domain is equivalent to multiplication in the frequency domain. As such, the block-based FIR filtering process depicted in FIG. 4 can be alternatively performed in the frequency domain as shown in FIG. 5. The B+1 FIR filters $h_0(t)$, $h_1(t)$, ..., $h_B(t)$ of FIG. 4 are now replaced by their frequency domain equivalents $H_0(\omega)$, $H_1(\omega)$, ..., $H_B(\omega)$. The delay elements are now denoted by $Z^{-D}$ 18, where D represents the length of the delay. The frequency domain processing can therefore be given as, $$M(\omega) = S(\omega)H_0(\omega) + S(\omega)z^{-D}H_1(\omega) + \ldots + S(\omega)z^{-BD}H_B(\omega)$$

or equivalently, $M(\omega) = \sum_{i=0}^{B} S(\omega)z^{-iD}H_i(\omega)$

As indicated in FIG. 5 this mathematical description may be extended to show the direct signal component and the reverberant component explicitly as follows, $$M(\omega) = S(\omega)H_0(\omega) + R(\omega)$$

$$M(\omega) = S(\omega)H_0(\omega) + \sum_{i=1}^{B} S(\omega)z^{-iD}H_i(\omega) \quad \text{where}$$

$$S(\omega)H_0(\omega)$$

is the frequency domain representation containing the direct signal component, and $$R(\omega) = \sum_{i=0}^{B} S(\omega)z^{-iD}H_i(\omega)$$

is the frequency domain representation of the reverberant signal component 19.

It will be appreciated by those skilled in the art that the effects of an FIR filter can be undone using an appropriate infinite impulse response (IIR) filter. Therefore, if the B+1 FIR filters $h_0(t)$, $h_1(t)$, ..., $h_B(t)$ are known precisely, then it is possible to recover the original dry signal $s(t)$ from $m(t)$ using an appropriate IIR filter structure. The original dry signal can also be recovered if the frequency domain representations $H_0(\omega)$, $H_1(\omega)$, ..., $H_B(\omega)$ of the FIR filters are known. The present invention makes use of this concept.

In many situations it is not possible to measure or derive the exact values of $H_0(\omega)$, $H_1(\omega)$, ..., $H_B(\omega)$ and thus it is not possible to exactly recover $s(t)$ from $m(t)$. In the present invention, perceptually relevant estimates of $H_0(\omega)$, $H_1(\omega)$, ..., $H_B(\omega)$ are used to derive an estimate of $S(\omega)$. These perceptually relevant estimates $\tilde{H}_0(\omega)$, $\tilde{H}_1(\omega)$, ..., $\tilde{H}_B(\omega)$ are based on estimates of the magnitudes of $H_0(\omega)$, $H_1(\omega)$, ..., $H_B(\omega)$ respectively.

Figure 6:
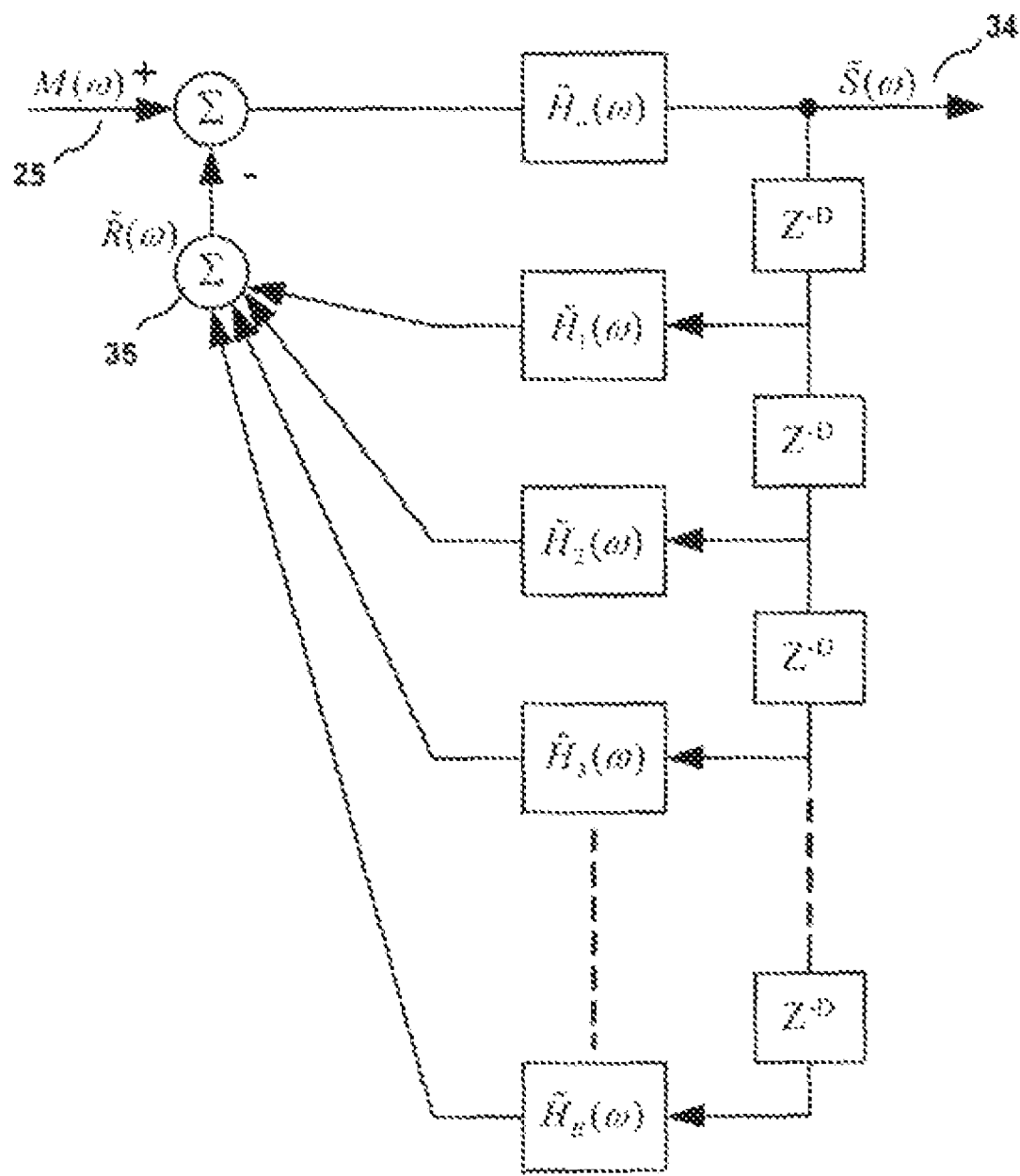
FIG. 6 depicts frequency domain block-based decomposition of a signal into dry and reverberant components.

The block-based estimate of the frequency domain representation of the impulse response $\tilde{H}(\omega)$, 23 is provided to the Decompose Processor 33. The Decompose Processor operates on the frequency domain representation of the input signal $M(\omega)$ 25 to produce an estimate of the direct signal component 34 and an estimate of the reverberant components 35. In the preferred embodiment the Decompose Processor operates as shown in FIG. 6. It can be seen from the figure that the Decompose Processor uses the perceptually relevant filter estimates $\tilde{H}_0(\omega)$, $\tilde{H}_1(\omega)$, ..., $\tilde{H}_B(\omega)$ to create a block-based IIR filter structure. The IIR filter structure takes $M(\omega)$ as its input and produces an estimate of the spectrum of the direct signal component $\tilde{S}(\omega)$ 34 as well as an estimate of the spectrum of the reverberant signal component $\tilde{R}(\omega)$ 35 The process can be described mathematically as follows, $$\tilde{S}(\omega)\tilde{H}_0(\omega) = M(\omega) - \left(\tilde{S}(\omega)z^{-D}\tilde{H}_1(\omega) + \ldots + \tilde{S}(\omega)z^{-BD}\tilde{H}_B(\omega)\right)$$

$$\tilde{S}(\omega) = \frac{M(\omega) - \left(\tilde{S}(\omega)z^{-D}\tilde{H}_1(\omega) + \ldots + \tilde{S}(\omega)z^{-BD}\tilde{H}_B(\omega)\right)}{\tilde{H}_0(\omega)}$$

To better understand this operation, it is useful to consider the process for a given block of the input signal $M_0(\omega)$. $M_0(\omega)$ consists of the current block of the dry signal convolved with $H_0(\omega)$, plus the previous block of the dry signal convolved with $H_1(\omega)$, and so on for the B previous blocks of the dry signal. We now use a subscript to indicate the block of the dry signal, and so $S_i(\omega)$ represents the frequency domain representation of the previous ith block of the dry signal component. Given this, the operation of the Decomposition Processor can be described mathematically as, $$\tilde{S}_0(\omega)\tilde{H}_0(\omega) = M_0(\omega) - \left(\tilde{S}_1(\omega)\tilde{H}_1(\omega) + \ldots + \tilde{S}_B(\omega)\tilde{H}_B(\omega)\right)$$

$$\tilde{S}_0(\omega) = \frac{M_0(\omega) - \left(\tilde{S}_1(\omega)\tilde{H}_1(\omega) + \ldots + \tilde{S}_B(\omega)\tilde{H}_B(\omega)\right)}{\tilde{H}_0(\omega)}$$

where $\tilde{S}_i(\omega)$ is an estimate of the true value of $S_i(\omega)$. In the preferred embodiment $\tilde{H}_0(\omega)$ is assumed to be equal 1, thus giving, $$\tilde{S}_0(\omega) = M_0(\omega) - (\tilde{S}_1(\omega)\tilde{H}_1(\omega) + \ldots + \tilde{S}_B(\omega)\tilde{H}_B(\omega))$$

Therefore, in the preferred embodiment of the present invention an estimate of the current block of the dry signal component 34 is obtained from the estimates of previous blocks of the dry signal, as well as the block-based estimates of the impulse response of the reverberant system. It should be noted that $(\tilde{S}_1(\omega)\tilde{H}_1(\omega) + \ldots + \tilde{S}_B(\omega)\tilde{H}_B(\omega))$ of the above equation is an estimate of the reverberant signal component 35. That is, $$\tilde{R}_0(\omega) = \tilde{S}_1(\omega)\tilde{H}_1(\omega) + \ldots + \tilde{S}_B(\omega)\tilde{H}_B(\omega)$$

In the preferred embodiment the overall reverberant signal component is divided into K reverberant sub-components $\tilde{R}_{0,1}(\omega)$, $\tilde{R}_{0,2}(\omega)$, ..., $\tilde{R}_{0,K}(\omega)$ as follows, $$\tilde{R}_{0,k}(\omega) = p_{1,k}(\omega)\tilde{S}_1(\omega)\tilde{H}_1(\omega) + \ldots + p_{B,k}(\omega)\tilde{S}_B(\omega)\tilde{H}_B(\omega)$$

Where $p_{i,k}(\omega)$ [i=0, . . . ,B and k=1, . . . ,K] are frequency-dependent gain vectors that allow the overall reverberant signal component to be selectively divided across time and frequency. This enables one to selectively extract portions of the reverberant signal that result from the dry sound being convolved by specific parts of the impulse response. For example, the reverberant signal component due to the early reflections 12 could be extracted separately from the components due to the reverberant tail 11. Similarly, different parts of the early reflections and/or the reverberant tail may be extracted separately. Moreover, the values of $p_{i,k}(\omega)$ may be chosen to selectively separate the low and high frequencies of different components of the reverberant signal.

In the preferred embodiment the block-based impulse response is estimated by the magnitude of the frequency domain representations of the B+1 blocks. Therefore, the above equations can be modified as follows, $$|\tilde{S}_0(\omega)|^2 = |M_0(\omega)|^2 - (|\tilde{S}_1(\omega)|^2|\tilde{H}_1(\omega)|^2 + \ldots + |\tilde{S}_B(\omega)|^2|\tilde{H}_B(\omega)|^2)$$

$$|\tilde{R}_0(\omega)|^2 = |\tilde{S}_1(\omega)|^2|\tilde{H}_1(\omega)|^2 + \ldots + |\tilde{S}_B(\omega)|^2|\tilde{H}_B(\omega)|^2$$

$$|\tilde{R}_{0,k}(\omega)|^2 = p_{1,k}(\omega)|\tilde{S}_1(\omega)|^2|\tilde{H}_1(\omega)|^2 + \ldots + p_{B,k}(\omega)|\tilde{S}_B(\omega)|^2|\tilde{H}_B(\omega)|^2$$

The phase of the input signal $M_0(\omega)$ is used as the phase response for $\tilde{S}_0(\omega)$ as well as for $\tilde{R}_{0,1}(\omega)$, $\tilde{R}_{0,2}(\omega)$, . . . , $\tilde{R}_{0,K}(\omega)$.

In the preferred embodiment the Decompose Processor operates by applying different gain vectors to the input signal, $$\tilde{S}_0(\omega) = G_S(\omega) M_0(\omega)$$

$$R_{0,1}(\omega) = G_{R_1}(\omega) M_0(\omega)$$

$$R_{0,2}(\omega) = G_{R_2}(\omega) M_0(\omega)$$

$$\ldots$$

$$R_{0,K}(\omega) = G_{R_K}(\omega) M_0(\omega)$$

The gain vector for the dry signal component is derived by, $$G_S(\omega) = \tilde{S}_0(\omega) / M_0(\omega)$$

$$G_S(\omega) = \frac{|M_0(\omega)|^2 - (|\tilde{S}_1(\omega)|^2|\tilde{H}_1(\omega)|^2 + \ldots + |\tilde{S}_B(\omega)|^2|\tilde{H}_B(\omega)|^2)}{|M_0(\omega)|^2}$$

$$G_S(\omega) = \begin{cases} \text{MinGain}(\omega); & G_S(\omega) < \text{MinGain}(\omega) \\ G_S(\omega); & \text{otherwise} \end{cases}$$

The frequency dependent parameter MinGain($\omega$) prevents $G_S(\omega)$ from falling below some desired value.

In the preferred embodiment the gain vector is a vector of real values and thus it only affects the magnitude of $M_0(\omega)$. As a result $\tilde{S}_0(\omega)$ has the same phase response as $M_0(\omega)$. The gain vectors for the reverberant signal components are found in similar fashion.

The values of the gain vectors $G_S(\omega)$, $G_{R_1}(\omega)$, . . . , $G_{R_K}(\omega)$ are further refined by employing a Perceptual Model 47 and a Source Model 46. The Perceptual Model accounts for the masking properties of the human auditory system, while the Source Model accounts for the physical characteristics of the sound sources. In this embodiment, the two models are combined and provide a smoothing of the gain vectors $G_S(\omega)$, $G_{R_1}(\omega)$, . . . , $G_{R_K}(\omega)$ over time and frequency. The smoothing over time is achieved as follows, $$G'_{S,\tau}(\omega) = (1-\gamma(\omega)) \cdot G'_{S,\tau-1}(\omega) + \gamma(\omega) \cdot G_{S,\tau}(\omega)$$

$$G'_{R_1,\tau}(\omega) = (1-\gamma(\omega)) \cdot G'_{R_1,\tau-1}(\omega) + \gamma(\omega) \cdot G_{R_1,\tau}(\omega)$$

$$G'_{R_2,\tau}(\omega) = (1-\gamma(\omega)) \cdot G'_{R_2,\tau-1}(\omega) + \gamma(\omega) \cdot G_{R_2,\tau}(\omega)$$

$$\ldots$$

$$G'_{R_K,\tau}(\omega) = (1-\gamma(\omega)) \cdot G'_{R_K,\tau-1}(\omega) + \gamma(\omega) \cdot G_{R_K,\tau}(\omega)$$

where $\tau$ indicates the current time frame of the process. $\gamma(\omega)$ determines for each frequency band the amount of smoothing that is applied to the gain vectors $G_S(\omega)$, $G_{R_1}(\omega)$, . . . , $G_{R_K}(\omega)$ over time. It will be appreciated that a different value of $\gamma(\omega)$ can be used for each gain vector. It will also be appreciated that the values of $\gamma(\omega)$ can vary with frequency. The values of $\gamma(\omega)$ may also change over time and they be dependent upon the input signal, or upon the values of the gain vectors.

The simultaneous masking properties of the human auditory system can be viewed as a form of smoothing or spreading of energy over frequency. In this embodiment, the simultaneous masking is computed as follows, $$\text{Masking}_S(\omega) = \text{spread1}(\omega) \cdot G'_{S,\tau}(\omega) + \text{spread2}(\omega) \cdot \text{Masking}_S(\omega-1)$$

$$\text{Masking}_{R_1}(\omega) = \text{spread1}(\omega) \cdot G'_{R_1,\tau}(\omega) + \text{spread2}(\omega) \cdot \text{Masking}_{R_1}(\omega-1)$$

$$\text{Masking}_{R_2}(\omega) = \text{spread1}(\omega) \cdot G'_{R_2,\tau}(\omega) + \text{spread2}(\omega) \cdot \text{Masking}_{R_2}(\omega-1)$$

$$\ldots$$

$$\text{Masking}_{R_K}(\omega) = \text{spread1}(\omega) \cdot G'_{R_K,\tau}(\omega) + \text{spread2}(\omega) \cdot \text{Masking}_{R_K}(\omega-1)$$

The variables spread1($\omega$) and spread2($\omega$) determine the amount of simultaneous masking across frequency. In this embodiment, spread1($\omega$) and spread2($\omega$) are designed to account for the fact that the bandwidths of the auditory filters increase with increasing frequency, and so more spreading is applied at higher frequencies.

The gain vectors are refined by adding the effects of the estimated masking. The frequency dependent parameter $\mu(\omega)$ determines the level at which the masking estimate is added to the previously computed gain vector values, $$G''_{S,\tau}(\omega) = G'_{S,\tau}(\omega) + \mu(\omega) \cdot \text{Masking}_S(\omega)$$

$$G''_{R_1,\tau}(\omega) = G'_{R_1,\tau}(\omega) + \mu(\omega) \cdot \text{Masking}_{R_1}(\omega)$$

$$G''_{R_2,\tau}(\omega) = G'_{R_2,\tau}(\omega) + \mu(\omega) \cdot \text{Masking}_{R_2}(\omega)$$

$$\ldots$$

$$G''_{R_K,\tau}(\omega) = G'_{R_K,\tau}(\omega) + \mu(\omega) \cdot \text{Masking}_{R_K}(\omega)$$

This step can cause the gain vector values to exceed 1.0. In this embodiment, the maximum gain values are limited to 1.0, although other limits are possible, $$G''_{S,\tau}(\omega) = \begin{cases} 1.0; & G''_{S,\tau}(\omega) > 1.0 \\ G''_{S,\tau}(\omega); & \text{otherwise} \end{cases}$$

Similar operations are performed for the remaining gain vectors. These final gain vectors are applied to the input signal $M(\omega)$ to produce the dry signal component 34 and the reverberant signal components 35. The dry signal component 34 may be modified by the Dry Signal Modifier 36 if desired. In this embodiment, modifications may include, but are not limited to level adjustments, frequency filtering, and dynamic range processing. The reverberant signal components 35 are operated on by the Reverberant Signal Modifier 37, where in this embodiment, modifications may include, but are not limited to level adjustments, frequency filtering, and dynamic range processing.

$$\tilde{S}'(\omega) = \text{Modify}[\tilde{S}(\omega)]$$
$$R'_1(\omega) = \text{Modify}[R_1(\omega)]$$
$$R'_2(\omega) = \text{Modify}[R_2(\omega)]$$
$$\ldots$$
$$R'_K(\omega) = \text{Modify}[R_K(\omega)]$$

Figure 7:
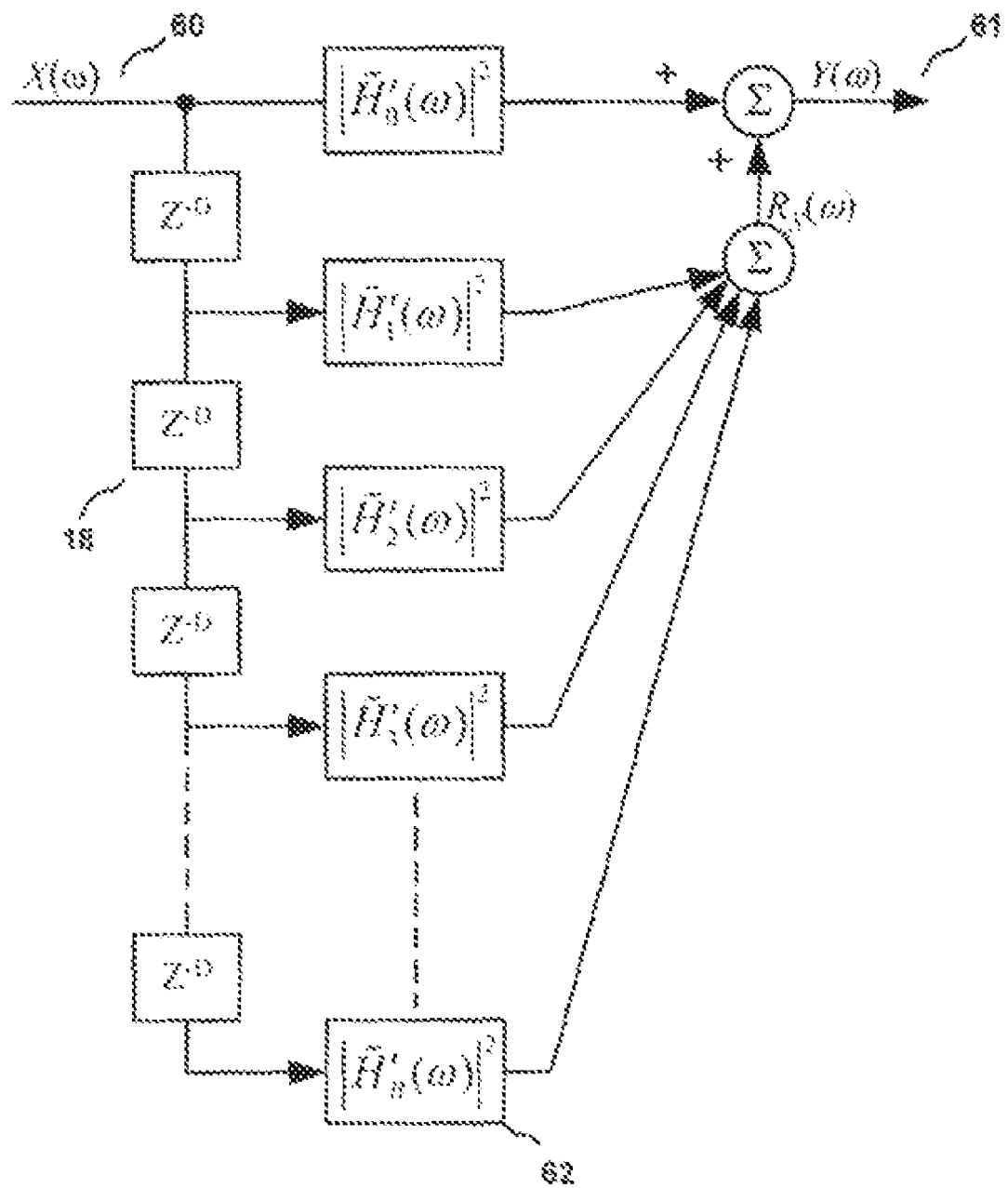
FIG. 7 depicts the frequency domain block-based convolution operation of the Recompose Processor 38.

The Recompose Processor 38 combines the modified dry sound estimate $\tilde{S}'(\omega)$, and the modified estimates of the reverberant signal sub-components $R_1'(\omega), R_2'(\omega), \ldots, R_K'(\omega)$ to produce one or more reverberation-adjusted frequency spectra 27. Another operation performed by the Recompose Processor is to apply a block-based impulse response to a signal $X(\omega)$ 60 to produce an output signal $Y(\omega)$ 61 as depicted in FIG. 7. The block-based impulse response may consist of either the original $|\tilde{H}_i(\omega)|^2$ derived by the Impulse Response Estimator 24, or a modified version $|\tilde{H}_i'(\omega)|^2$ 62. The input signal $X(\omega)$ to this process may consist of one or more of $\tilde{S}'(\omega), R_1'(\omega), R_2'(\omega), \ldots, R_K'(\omega)$, or a secondary input signal $S_2(\omega)$. Different versions of $|\tilde{H}_i'(\omega)|^2$ may be used for different input signals. The output signals from this block-based convolution process provide additional reverberation-adjusted frequency spectra 27. The Recompose Processor 38 includes a Source Model and a Perceptual Model. In this embodiment the Source Model 48 and the Perceptual Model 49 are combined with the Source Model 46 and Perceptual Model 47 of the Decompose Processor 33.

The unprocessed input signal $M(\omega)$ 25 and the reverberation-adjusted frequency spectra 27 are provided to the Signal Modifier 28. The Signal Modifier produces the final L output frequency spectra $Z_1(\omega), Z_2(\omega), \ldots, Z_L(\omega)$, which are converted to the time domain to obtain the desired output signals $z_1(t), z_2(t), \ldots, z_L(t)$ 32. In this embodiment the frequency-to-time domain converter 30 consists of a fast implementation of the Inverse Discrete Fourier Transform (IDFT) followed by a root-Hanning window 31.

For applications where the invention is used to create a monophonic output signal (i.e., L=1), the Signal Modifier 28 operates on the reverberation-adjusted spectra 27 to combine them to create a modified version of the input signal with modified reverberant characteristics.

For applications where the invention is used to create additional audio channels from a monophonic input signal, the Signal Modifier's 28 operations include operating on the reverberation-adjusted frequency spectra 27 to combine them to create two or more unique output frequency spectra $Z_1(\omega), Z_2(\omega), \ldots, Z_L(\omega)$.

In some applications there is no need for the Signal Modifier 28 to modify either the unprocessed input signal $M(\omega)$ 25 or the reverberation-adjusted frequency spectra 27, and so the Signal Modifier may simply pass these signals to the final output frequency spectra $Z_1(\omega), Z_2(\omega), \ldots, Z_L(\omega)$.

The previous steps in the preferred embodiment require a suitable block-based estimate of the impulse response of the reverberant system. The Impulse Response Estimator 24 operates on the frequency-domain representation of the input signal $M(\omega)$ 25 to produce the block-based estimates $\tilde{H}_0(\omega), \tilde{H}_1(\omega), \ldots, \tilde{H}_B(\omega)$ of the impulse response.

Two factors combine to determine the rate at which a reverberant input signal $M(\omega)$ 25 decays (or grows) at a given frequency. The first factor is the rate of decay (or growth) of the dry sound source s(t) 1, and the second is the rate of decay of the reverberant system. While the rate of decay of the reverberant system (e.g. a concert hall) at a given frequency is relatively constant over time, the rate of decay of the dry sound source varies continuously. Using the earlier example of a singer, the level of the singer's voice at a given frequency rises and drops continuously over time. Therefore, the fastest rate of decay of the input signal $M(\omega)$ 25 occurs when the dry sound source s(t) 1 stops at a given frequency, and the decay in the signal is due entirely to the decay of the reverberant system.

If one considers a given frequency, then it can be seen that the best opportunity to estimate $|\tilde{H}_i(\omega)|^2$ is when the dry sound source s(t) 1 has just stopped at that frequency. At that point what follows is the reverberant component r(t) of the signal, and the decay of the reverberant system can be observed. Given this, one can obtain an estimate $|\tilde{H}_i(\omega)|^2$ by observing the ratio of the magnitude of the current block $|M_0(\omega)|^2$ to that of a previous block $|M_i(\omega)|^2$, and estimating the minimum value of this ratio.

$$|C_i(\omega)|^2 = \begin{cases} \frac{|M_0(\omega)|^2}{|M_i(\omega)|^2}; & \frac{|M_0(\omega)|^2}{|M_i(\omega)|^2} < |\tilde{H}_i(\omega)|^2 \\ |\tilde{H}_i(\omega)|^2 \cdot Bias_i(\omega) + \varepsilon; & \text{otherwise} \end{cases}$$
$$i = 1, \ldots, B$$

where $Bias_i(\omega)$ is some value greater than 1.0 and $\varepsilon$ is some small value. The frequency dependent parameter $Bias_i(\omega)$ prevents $|C_i(\omega)|^2$ from being trapped at an incorrect minimum value, while $\varepsilon$ prevents $|C_i(\omega)|^2$ from being trapped at a value of zero. The minimum of the above ratio corresponds to the fastest rate of decay of the signal at that frequency, and therefore it corresponds to an estimate of $|\tilde{H}_i(\omega)|^2$ at that frequency. This process is performed at each frequency $\omega$ for all blocks $[i=1, \ldots, B]$.

In this embodiment the Source Model is implemented as follows, $$|C_i(\omega)|^2 = \begin{cases} MaxValue_i(\omega); & |C_i(\omega)|^2 > MaxValue_i(\omega) \\ |C_i(\omega)|^2; & \text{otherwise} \end{cases}$$
$$i = 1, \ldots, B$$

The parameter $MaxValue_i(\omega)$ prevents $|C_i(\omega)|^2$ and thus $|\tilde{H}_i(\omega)|^2$ from exceeding some value that would not be expected in real acoustic spaces. $MaxValue_i(\omega)$ can vary over frequency and across blocks. A temporal smoothing operation is applied to provide a more stable estimate of $|\tilde{H}_i(\omega)|^2$.

$$|\tilde{H}_{i,\tau}(\omega)|^2 = \alpha_i(\omega)|\tilde{H}_{i,\tau-1}(\omega)|^2 + (1-\alpha_i(\omega))|C_i(\omega)|^2$$

Where $\tau$ indicates the current time frame of the process, and $\alpha_i(\omega)$ is a frequency dependent parameter that controls the amount of temporal smoothing. $\alpha_i(\omega)$ may also vary over time and across blocks, and its value may be dependent upon the current block of the input signal as well as previous blocks of the input signal.

In this embodiment, smoothing of $|\tilde{H}_i(\omega)|^2$ over frequency is performed as part of the Source Model. The amount of smoothing is determined by the value of $\beta_i(\omega)$. $\beta_i(\omega)$ can vary over frequency and across blocks.

$$|\tilde{H}'_i(\omega)|^2 = \beta_i(\omega)|\tilde{H}'_i(\omega)|^2 + \frac{1-\beta_i(\omega)}{2}(|\tilde{H}'_i(\omega-1)|^2 + |\tilde{H}'_i(\omega+1)|^2)$$

The final estimates $|\tilde{H}_i'(\omega)|^2$ [i=1, ..., B], of the block-based impulse response are employed to derive the gain vectors that are used to derive the estimate of the dry sound, as well as the estimates of the reverberant components.

The preferred embodiment has been described for the case where the input signal is monophonic. It will be appreciated that the present invention can be directly extended to operate on stereo and multichannel input signals. When the input signal has more than one channel, it is understood that the present invention can either operate on each channel independently, or the operations on the channels may be combined and information regarding a given channel may be used in the processing of the other channels.

The B+1 blocks 15, 16 of the impulse response do not need to be of equal size. For example, it may be desirable to use shorter blocks to represent the initial part of the impulse response in order to obtain better temporal resolution for the early reflection portion 12 of the impulse response.

The B+1 blocks 15 of the impulse response may overlap, or they may not have any overlap as depicted in FIG. 2. In the case where the blocks overlap, a window function may be used to provide a smooth transition from block to block. In the preferred embodiment, the blocks have a 50% overlap.

In the preferred embodiment the magnitude-squared $|\cdot|^2$ of the frequency domain representation of the signals and impulse response was used in the processing. It will be appreciated that other powers of magnitude $|\cdot|^q$ can be used.

For applications where reverberation is being added to a second input signal $s_2(t)$ 40, the Recompose Processor may include a block-based frequency domain FIR filter structure as depicted in FIG. 7. The filters consist of modified estimates of the magnitudes of the impulse response blocks $\tilde{H}_0'(\omega)$, $\tilde{H}_1'(\omega)$, ..., $\tilde{H}_B'(\omega)$. In the preferred embodiment the Recompose Processor accomplishes this by applying gain vectors to the input signal.

In the preferred embodiment, the Decompose Processor 33 and the Recompose Processor 38 operate independently of each other. It will be appreciated that, in some applications, aspects of the two processes may be combined.

The invention can be used generally to create additional audio channels based on the input signal $M(\omega)$ 25. That is, the invention can be used to create V output channels from an input signal $M(\omega)$ 25 having U channels, where V>U. Examples of this include creating a stereo or multichannel signal from a monophonic input signal; creating a multichannel signal from a stereo input signal; and creating additional channels from a multichannel input signal. In general this is accomplished by extracting and decomposing the reverberant component of the signal into different subcomponents $R_1(\omega)$, $R_2(\omega)$, ..., $R_K(\omega)$ 35, and distributing them to different output channels. A given subcomponent of the reverberant signal may be assigned to more than one output channel. The created channels may also include the estimate of the dry signal component $\tilde{S}(\omega)$ 34 and the input signal $M(\omega)$ 25.

In the preferred embodiment, the Decompose Processor 33 employs the block-based estimate of the impulse response $\tilde{H}_0(\omega), \tilde{H}_1(\omega), \ldots, \tilde{H}_B(\omega)$ to operate on the input signal $M(\omega)$ 25 to derive a perceptually suitable set of reverberant subcomponents. The Recompose Processor 38 operates on the estimate of the dry signal $\tilde{S}(\omega)$ 34 and the reverberant subcomponents 35 to derive a set of reverberation-adjusted frequency spectra 27. In some instances the Signal Modifier 28 may assign the reverberation-adjusted frequency spectra directly to the final V output frequency spectra $Z_1(\omega)$, $Z_2(\omega)$, ..., $Z_V(\omega)$ 29. The final output frequency spectra are converted to the time domain 30, and windowed 31 to provide the multichannel audio signal consisting of $z_1(t), z_2(t), \ldots, z_V(t)$ 32.

In other instances, the Signal Modifier 28 may selectively combine two or more of the reverberation-adjusted frequency spectra 27 to create the V output frequency spectra. The Signal Modifier may also include the unprocessed input signal $M(\omega)$ 25 in one or more of the V output frequency spectra.

Figure 8:
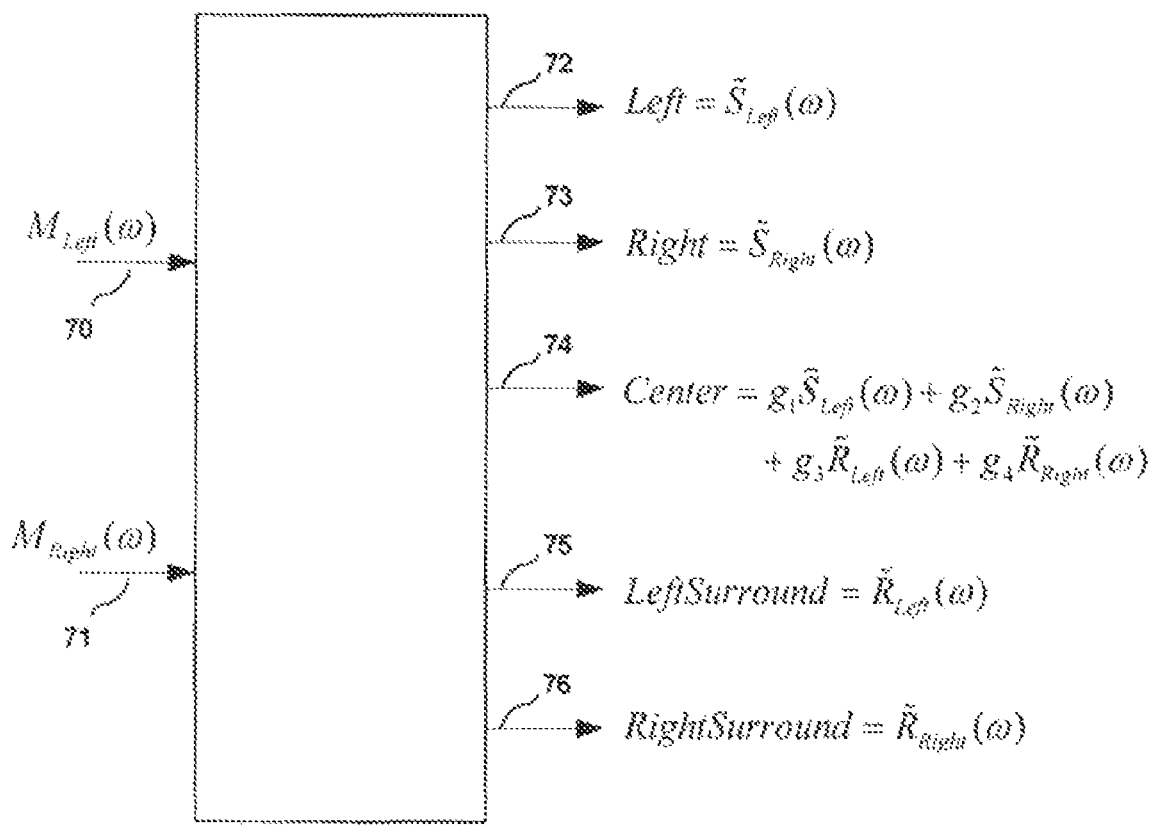
FIG. 8 depicts a means of creating a multichannel output signal from a stereo input signal.

As an example, one approach to creating a five-channel (V=5) output signal from a stereo input signal (U=2) is considered as depicted in FIG. 8. The Left input signal $M_{Left}(\omega)$ 70 is decomposed into its direct signal component $\tilde{S}_{Left}(\omega)$ and reverberant signal component $\tilde{R}_{Left}(\omega)$. The Left-channel direct signal component $\tilde{S}_{Left}(\omega)$ is sent to the Left output channel 72, while the Left-channel reverberant signal component $\tilde{R}_{Left}(\omega)$ is sent to the Left-Surround output channel 75. Similarly, the Right input signal $M_{Right}(\omega)$ 71 is decomposed, and the Right-channel direct signal component $\tilde{S}_{Right}(\omega)$ is sent to the Right output channel 73, while the Right-channel reverberant signal component $\tilde{R}_{Right}(\omega)$ is sent to the Right-Surround output channel 74. The Center output channel 74 is made up of some mixture $g_1\tilde{S}_{Left}(\omega)+g_2\tilde{S}_{Right}(\omega)+g_3\tilde{R}_{Left}(\omega)+g_4\tilde{R}_{Right}(\omega)$, where $g_1, g_2, g_3$ and $g_4$ determine the relative level at which the components are mixed together. It will be appreciated that this example is simply one of the virtually unlimited means by which the invention can decompose the input signal to create additional audio channels.

Other Embodiments of the Present Invention

1. A method for decomposing a reverberant signal into the direct sound component and/or one or more reverberant components by decomposing the signal using block based estimates of the frequency domain representation of the impulse response.
   1.1. Method of Claim 1 where the signal is decomposed into the direct sound component and/or one or more reverberant components based on only a magnitude representation of the description of the frequency domain representation of the impulse response.
   1.2. Method of Claim 1 where the signal is decomposed into the direct sound component and/or one or more reverberant components using a transform representation
   1.3. Method of Claim 1 where the signal is decomposed into the direct sound component and/or one or more reverberant components using a filter bank representation
   1.4. Method of Claim 1 where the signal is decomposed into the direct sound component and/or one or more reverberant components, and only the direct sound component is output
   1.5. Method of Claim 1 where the signal is decomposed into the direct sound component and/or one or more reverberant components, and only one or more of the reverberant components is output
2. A method for creating an output signal by first decomposing a reverberant signal using the method according to Claim 1 and modifying the direct sound component and/or one or more reverberant components before recombining them.

2.1. Method of Claim 2 where the process is used to reduce reverberation in a telephone or teleconferencing equipment 2.2. Method of Claim 2 where the process is used to increase the intelligibility of a reverberant speech signal 2.3. Method of Claim 2 where the process is used to reduce reverberation to increase the recognition rate of a speech recognition system 2.4. Method of Claim 2 where the process is used to reduce acoustic feedback in a public address system by reducing the reverberation due to an amplified signal 2.5. Method of Claim 2 where the process is used to increase the intelligibility of a reverberant speech signal in hearing aid devices 2.6. Method of Claim 2 where only the direct sound component is extracted and modified 2.7. Method of Claim 2 where the direct sound component is modified prior to recombining with one or more of the reverberant components 2.7.1. Method of Claim 2.7 where the modification consists of applying noise reduction to the direct sound component 2.7.2. Method of Claim 2.7 where the modification consists of adding an audio watermark to the direct sound component 2.8. Method of Claim 2 where the reverberant component is modified prior to recombining with the direct sound component 2.9. Method of Claim 2 where both the direct sound component and one or more of the reverberant components are modified prior to combining the components.

2.10. Method of Claim 2 where the ratio of the direct to reverberant sound is modified prior to recombining the direct sound and reverberant components.

2.11. Method of Claim 2 where only certain reverberant components are modified prior to recombining with the direct sound component.

3. A method for creating an output signal consisting of a direct sound component and/or one or more reverberant components using block based estimates of the frequency domain representation of an impulse response.

3.1. Method of Claim 3 where the output signal is created based on only a magnitude representation of the frequency domain representation of the impulse response.

3.2. Method of Claim 3 where the output signal is created using a transform representation of the impulse response 3.3. Method of Claim 3 where the output signal is created using a filter bank representation of the impulse response 3.4. Method of Claim 3 where the frequency domain representation of the impulse response is modified to create multiple reverberant output signals 3.4.1. Method of Claim 3.4 where the multiple reverberant output signals are used to create a stereo signal from a monophonic signal 3.4.2. Method of Claim 3.4 where the multiple reverberant output signals are used in a multichannel surround sound system 3.4.3. Method of Claim 3.4 where the multiple reverberant output signals are used in a three-dimensional headphone system 3.5. Method of Claim 3 where the output signal is created by applying the frequency domain representation of the impulse response derived from a first signal to the direct sound component of a second signal.

3.5.1. Method of Claim 3.5 where the direct sound component of the second signal is derived using the method according to Claim 1.

4. A method for extracting a description of a reverberant system from a reverberant signal by
breaking the overall impulse response of the underlying reverberant system into a series of blocks representing portions of the impulse response
extracting an estimate of the frequency domain representation of the impulse response for each block by comparing frequency domain representations of the signal in the current frame with that of previous frames 4.1. Method of Claim 4 where the comparison of frequency domain representations is based on the tracking the rate of change of the frequency components of the signal 4.1.1. Method of Claim 4.1 where the maximum rate of change is used 4.1.1.1. Method of Claim 4.1.1 where the frequency domain representation $H_i(\square)$ for block i is based on $\min\{M_o(\square)/M_i(\square)\}$ 4.1.2. Method of Claim 4.1 where the rate of change is smoothed 4.2. Method of Claim 4 where the frequency domain representation of the impulse response for each block is constrained by a physical model 4.2.1. Method of Claim 4.2 where the physical model of the reverberant system assumes an exponential decay after a given time.

4.3. Method of Claim 4 where the frequency domain representation of the impulse response for each block is derived using a perceptual model 4.3.1. Method of Claim 4.3 where the perceptual model accounts for the frequency dependent selectivity of the ear 4.4. Method of Claim 4 where the perceptually relevant reverberant characteristics of a real acoustic space are captured without having to directly measure the impulse response of that space.

5. A method of creating an output signal according to the method of Claim 3 by decomposing a signal according to the method of Claim 1 and modifying the direct sound component and/or the block based estimate of the frequency domain representation of an impulse response 5.1. Method of Claim 5 where only the direct sound component is modified prior to creating the output signal 5.1.1. Method of Claim 5.1 where the modification consists of applying noise reduction to the direct sound component 5.1.2. Method of Claim 5.1 where the modification consists of adding an audio watermark to the direct sound component 5.1.3. Method of Claim 5.1 where the modification consists of audio data reduction encoding and decoding of the direct sound component 5.1.3.1. Method of Claim 5.1.3 where the decomposition and compression encoding are performed by one device, and the compression decoding and output signal creation are performed by another device.

5.1.3.2. Method of Claim 5.1.3 where the block based estimate of the frequency domain representation of the impulse response is included in the compressed audio bitstream.

5.2. Method of Claim 5 where the block based estimate of the frequency domain representation of an impulse response is derived according to the method of Claim 4.

What is claimed is:

1. A method of estimating an impulse response for a reverberant system comprising the steps of:
   sampling a signal from a reverberant system, having an impulse response, into a sequence of blocks;
   for each block of the sequence, determining a ratio of a magnitude of a respective current block to a magnitude of a respective previous block; and
   forming an estimated impulse response descriptive of the reverberant system using the determined ratio.

2. A method as claimed in claim 1 where the step of sampling is time-domain based.

3. A method as claimed in claim 1 where the step of sampling is frequency-domain based.

4. A method as claimed in claim 1 where the step of sampling provides equal blocks.

5. A method as claimed in claim 4 where the blocks are overlapping.

6. A method as claimed in claim 1 where the step of sampling uses a window.

7. A method as claimed in claim 1 wherein the step of determining the ratio includes finding the ratio with a square of the magnitude of the respective current block to a square of the magnitude of the respective previous block.

8. A method as claimed in claim 1 where the step of sampling uses a filter bank.

9. A method as claimed in claim 1 where the step of forming an estimate includes a step of smoothing.

10. A method as claimed in claim 1 where the signal is a first signal, the method further comprising the steps of using the estimated impulse response to create a finite impulse response filter and applying the finite impulse response filter to a second signal to produce an artificial reverberant signal so that reverberant characteristics of the first signal are included in the second signal, the second signal being different than the first signal.

11. A method as claimed in claim 1 where forming an estimated impulse response further comprises identifying a reverberant component of the signal.

12. A method as claimed in claim 1 where determining a ratio of a magnitude of a respective current block to a magnitude of a respective previous block comprises identifying a minimum value of the ratio, and forming the estimated impulse response as a function of the minimum value of the ratio.

13. A method as claimed in claim 12 where forming the estimated impulse response comprises using the minimum value of the ratio and a previous estimated impulse response to form the estimated impulse response.

14. A method as claimed in claim 1 where forming the estimated impulse response comprises comparing the ratio to a previous estimated impulse response, and forming the estimated impulse response in accordance with the comparison.

15. A method as claimed in claim 1 further comprising the steps of using the estimated impulse response to create a finite impulse response filter and applying the finite impulse response filter to the signal to produce an estimate of a spectrum of a reverberant signal component.

16. A method of estimating an impulse response for a reverberant system comprising the steps of:
   sampling a signal from a reverberant system, having an impulse response, into a sequence of blocks;
   for each block of the sequence, determining a magnitude in dependence upon a magnitude of a previous block, wherein the step of determining includes finding a ratio of a power q of a current magnitude to a power q of a previous magnitude, where q is a positive number; and
   forming an estimate of the impulse response using determined magnitudes.

17. A method of decomposing a signal from a reverberant system comprising the steps of:
   sampling a signal from a reverberant system, having an impulse response, into a sequence of blocks;
   for each block of the sequence, determining a magnitude in dependence upon a magnitude of a previous block;
   forming an estimated impulse response using determined magnitudes; and
   applying an inverse of the estimated impulse response to the signal to derive at least one of a direct signal component and a reverberant signal component of the signal.

18. A method as claimed in claim 17 where the step of sampling is time domain based.

19. A method as claimed in claim 17 where the step of sampling is frequency-domain based.

20. A method as claimed in claim 17 where the step of sampling provides equal blocks.

21. A method as claimed in claim 20 where the blocks are overlapping.

22. A method as claimed in claim 17 where the step of sampling uses a window.

23. A method as claimed in claim 17 where the step of determining includes finding a ratio of a square of a current magnitude to a square of a previous magnitude.

24. A method as claimed in claim 17 where the step of sampling uses a filter bank.

25. A method as claimed in claim 17 where the step of forming an estimate includes a step of smoothing.

26. A method as claimed in claim 17 further compromising the step of modifying at least one of the direct signal component and the reverberant signal component.

27. A method as claimed in claim 26 further compromising the step of recombining at least one of the modified direct signal component and the reverberant signal component; the modified direct signal component and the modified reverberant signal component; and the direct signal component and the modified reverberant signal component.

28. A method of decomposing a signal from a reverberant system comprising the steps of:
   sampling a signal from a reverberant system, having an impulse response, into a sequence of blocks;
   for each block of the sequence, determining a magnitude in dependence upon a magnitude of a previous block, wherein the step of determining includes finding a ratio of a power q of a current magnitude to a power q of a previous magnitude, where q is a positive number;
   forming an estimate of the impulse response using determined magnitudes; and
   applying an inverse of the estimated impulse response to the signal to derive at least one of a direct signal component and a reverberant signal component.

29. A method of decomposing a signal from a reverberant system comprising the steps of:
   sampling a signal from a reverberant system, having an impulse response, into a sequence of blocks;
   for each block of the sequence, determining a magnitude value in dependence upon a magnitude of a sample of the signal of a previous block in the sequence of blocks;
   forming an estimated impulse response descriptive of the reverberant system using the determined magnitude value for each of the blocks as parameters for a finite impulse response filter;

applying an inverse of the estimated impulse response to the signal to derive a direct signal component of the signal;

modifying at least one of the finite impulse response filter and the direct signal component; and recomposing a modified reverberant signal therefrom.

30. A method as claimed in claim 29 where the step of sampling is time-domain based.

31. A method as claimed in claim 29 where the step of sampling is frequency-domain based.

32. A method as claimed in claim 29 where the step of sampling provides equal blocks.

33. A method as claimed in claim 32 where the blocks are overlapping.

34. A method as claimed in claim 29 where the step of sampling uses a window.

35. A method as claimed in claim 29 wherein the step of determining includes finding a ratio of a square of a current magnitude to a square of the magnitude of the sample of the signal of the previous block in the sequence.

36. A method as claimed in claim 29 where the step of sampling uses a filter bank.

37. A method as claimed in claim 29 where the step of forming an estimated impulse response includes a step of smoothing.

38. A method of decomposing a signal from a reverberant system comprising the steps of:

sampling a signal from a reverberant system, having an impulse response, into a sequence of blocks;

for each block of the sequence, determining a magnitude in dependence upon a magnitude of a previous block, wherein the step of determining includes finding a ratio of a power q of a current magnitude to a power q of a previous magnitude, where q is a positive number;

forming an estimate of the impulse response using determined magnitudes as parameters for a finite impulse response filter;

applying an inverse of the estimated impulse response to the signal to derive a direct signal component;

modifying at least one of the finite impulse response filter and the direct signal component; and recomposing a modified reverberant signal therefrom.

39. A method of creating a multi-channel signal using a signal with fewer channels from a reverberant system comprising the steps of:

sampling the signal with fewer channels from a reverberant system, having an impulse response, into a sequence of blocks;

for each block of the sequence, determining a magnitude in accordance with a ratio of a respective current sample to a respective previous sample;

forming an estimated impulse response using the determined magnitude;

applying an inverse of the estimated impulse response to the signal to derive at least one of a direct signal component and a reverberant signal component of the signal; and recombining the direct signal component and the reverberant signal component to create a multi-channel signal.

40. A method as claimed in claim 39 where the signal with fewer channels is a monophonic signal and the multi-channel signal is a stereophonic signal.

41. A method as claimed in claim 39 where the signal with fewer channels is a stereophonic signal and the multi-channel signal is a surroundsound signal.

* * * * *